US012562784B2

(12) United States Patent (10) Patent No.: US 12,562,784 B2
Tsodik et al. (45) Date of Patent: *Feb. 24, 2026

(54) TECHNIQUES FOR BEAMFORMING

(71) Applicant: HUAWEI TECHNOLOGIES CO., LTD., Shenzhen (CN)

(72) Inventors: Genadiy Tsodik, Hod Hasharon (IL); Shimon Shilo, Hod Hasharon (IL); Oded Redlich, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/086,125

(22) Filed: Mar. 20, 2025

(65) Prior Publication Data

US 2025/0219683 A1 Jul. 3, 2025

Related U.S. Application Data

(63) Continuation of application No. 18/171,223, filed on Feb. 17, 2023, now Pat. No. 12,284,009, which is a
(Continued)

(51) Int. Cl.
*H04B 7/04* (2017.01)
*H04B 7/0426* (2017.01)
*H04B 7/0456* (2017.01)

(52) U.S. Cl.
CPC ........... *H04B 7/043* (2013.01); *H04B 7/0456* (2013.01)

(58) Field of Classification Search
CPC .... H04B 7/043; H04B 7/0456; H04B 7/0634; H04B 7/0663; H04B 7/0695; H04B 7/088;
(Continued)

(56) References Cited

U.S. PATENT DOCUMENTS 12,284,009 B2 * 4/2025 Tsodik ................. H04B 7/0663
2008/0212461 A1 * 9/2008 Pande ................. H04L 25/0248
370/203

(Continued)

FOREIGN PATENT DOCUMENTS

CN 109041030 A 12/2018
CN 109547072 A 3/2019
(Continued)

OTHER PUBLICATIONS

Chen et al., "EHT Punctured NDP and Partial BW Feedback Tones," IEEE 802.11-20/1161r0, Total 15 pages (Aug. 25, 2020).
(Continued)

*Primary Examiner* — Emmanuel Bayard
(74) *Attorney, Agent, or Firm* — Leydig, Voit & Mayer, Ltd.

(57) ABSTRACT

The present disclosure relates to techniques for beamforming, in particular for WiFi communication schemes such as IEEE 802.11ax and 802.11be. In particular the disclosure relates to a beamformer device (110) configured to: transmit a request to a beamformee device (120), the request comprising a set of sounding tone indices, the set of sounding tone indices indicating tones for which a report (121) of beamforming information is requested from the beamformee device (120), wherein the tones are defined according to a first WiFi scheme, wherein the set of sounding tone indices is based on a first tone plan (400) defined by the first WiFi scheme for a partial channel bandwidth and on a second tone plan (200) defined by a second WiFi scheme for a full channel bandwidth. The disclosure further relates to a corresponding beamformee device.

20 Claims, 31 Drawing Sheets

Related U.S. Application Data continuation of application No. PCT/EP2020/073109, filed on Aug. 18, 2020.

(58) Field of Classification Search
CPC ........ H04B 7/12; H04B 7/0617; H04B 7/086; H04W 72/0453; H04W 72/0457
USPC ......................................... 375/262, 267, 295
See application file for complete search history.

(56) References Cited

U.S. PATENT DOCUMENTS

| | | | |
|---|---|---|---|
| 2016/0295513 A1 | 10/2016 | Moon et al. | |
| 2017/0054542 A1* | 2/2017 | Vermani | H04B 7/0626 |
| 2018/0041257 A1* | 2/2018 | Chen | H04B 7/024 |
| 2019/0349067 A1* | 11/2019 | Huang | H04B 7/0697 |
| 2020/0274592 A1* | 8/2020 | Mandula | H04L 25/0204 |
| 2020/0382192 A1* | 12/2020 | Sethuraman | H04B 7/0617 |
| 2021/0266890 A1* | 8/2021 | Chu | H04W 72/51 |
| 2021/0377749 A1 | 12/2021 | Boroujeni et al. | |
| 2021/0409078 A1* | 12/2021 | Jeon | H04L 69/08 |
| 2021/0409249 A1* | 12/2021 | Chen | H04L 5/0048 |

FOREIGN PATENT DOCUMENTS

| | | |
|---|---|---|
| CN | 111226133 A | 6/2020 |
| JP | 2016500942 A | 1/2016 |
| JP | 2018538723 A | 12/2018 |
| KR | 20140037128 A | 3/2014 |

OTHER PUBLICATIONS

Liang et al., "EHT-LTFs Design," IEEE 802.11-20/0117r1, Total 18 pages (Jan. 2020).

Verma et al., "Comment Resolutions on Clause 9.4.1 Part 2," IEEE 802.11-16/1097r0, Total 11 pages (Aug. 2016).

* cited by examiner

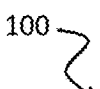
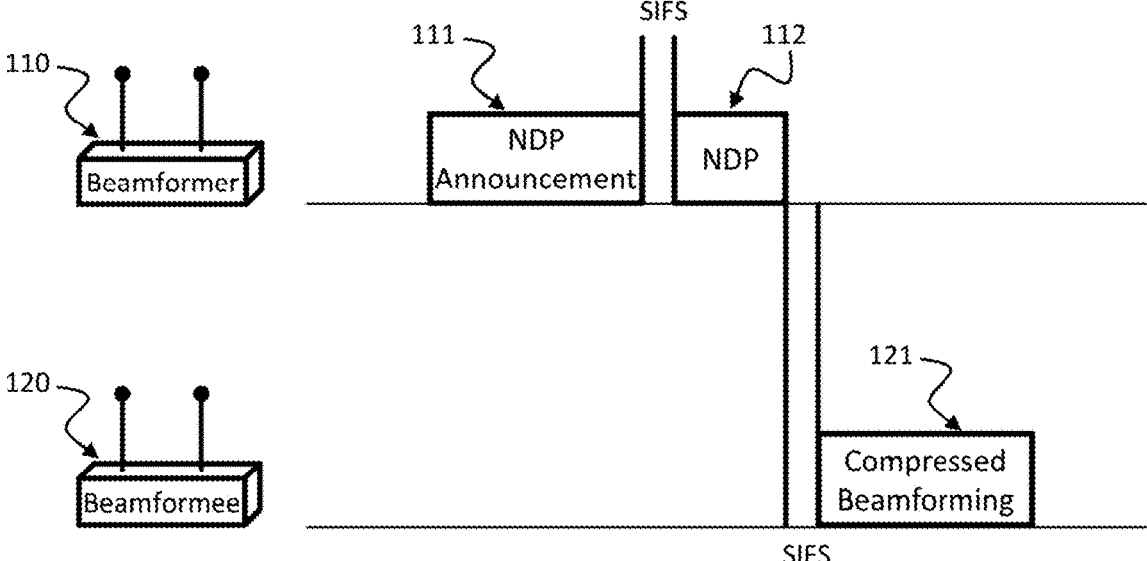
Fig. 1

300

| RU Index | 20 MHz | | 40 MHz | | 80 MHz | | 160 MHz | | 80+80 MHz | |
|---|---|---|---|---|---|---|---|---|---|---|
| | S | E | S | E | S | E | S | E | S | E |
| 0 | -122 | -84 | -244 | -212 | -500 | -468 | -1012 | -980 | -500(L) | -468(L) |
| 1 | -100 | -68 | -228 | -180 | -484 | -436 | -996 | -948 | -484(L) | -436(L) |
| 2 | -68 | -36 | -196 | -164 | -452 | -420 | -964 | -932 | -452(L) | -420(L) |
| 3 | -52 | -4 | -164 | -132 | -420 | -388 | -932 | -900 | -420(L) | -388(L) |
| 4 | -20 | 20 | -148 | -100 | -404 | -356 | -916 | -868 | -404(L) | -356(L) |
| 5 | 4 | 52 | -116 | -84 | -372 | -340 | -884 | -852 | -372(L) | -340(L) |
| 6 | 36 | 68 | -84 | -52 | -340 | -308 | -852 | -820 | -340(L) | -308(L) |
| 7 | 68 | 100 | -68 | -20 | -324 | -276 | -836 | -788 | -324(L) | -276(L) |
| 8 | 84 | 122 | -36 | -4 | -292 | -260 | -804 | -772 | -292(L) | -260(L) |

| RU Index | 80MHz | |
|---|---|---|
| | S | E |
| 0 | -500 | -472 |
| 1 | -476 | -448 |
| 2 | -448 | -420 |
| 3 | -420 | -392 |
| 4 | -392 | -364 |
| 5 | -368 | -340 |
| 6 | -340 | -312 |
| 7 | -312 | -284 |
| 8 | -288 | -260 |
| 9 | -260 | -224 |
| 10 | -228 | -200 |
| 11 | -200 | -172 |
| 12 | -176 | -144 |
| 13 | -148 | -116 |
| 14 | -120 | -92 |
| 15 | -92 | -64 |
| 16 | -64 | -36 |
| 17 | -40 | -12 |
| Center Portion | -16 | 16 |
| 18 | 12 | 40 |
| 19 | 36 | 64 |
| 20 | 64 | 92 |
| 21 | 92 | 120 |
| 22 | 116 | 148 |
| 23 | 144 | 176 |
| 24 | 172 | 200 |
| 25 | 200 | 228 |
| 26 | 224 | 260 |
| 27 | 260 | 288 |
| 28 | 284 | 312 |
| 29 | 312 | 340 |
| 30 | 340 | 368 |
| 31 | 364 | 392 |
| 32 | 392 | 420 |
| 33 | 420 | 448 |
| 34 | 448 | 476 |
| 35 | 472 | 500 |

600

| RU Index | 80MHz | |
|---|---|---|
| | S | E |
| 0 | -500 | -468 |
| 1 | -484 | -436 |
| 2 | -452 | -420 |
| 3 | -420 | -388 |
| 4 | -404 | -356 |
| 5 | -372 | -340 |
| 6 | -340 | -308 |
| 7 | -324 | -276 |
| 8 | -292 | -260 |
| 9 | -260 | -212 |
| 10 | -228 | -196 |
| 11 | -212 | -164 |
| 12 | -180 | -132 |
| 13 | -148 | -116 |
| 14 | -132 | -84 |
| 15 | -100 | -52 |
| 16 | -68 | -36 |
| 17 | -52 | -4 |
| 18 | 4 | 52 |
| 19 | 36 | 68 |
| 20 | 52 | 100 |
| 21 | 84 | 132 |
| 22 | 116 | 148 |
| 23 | 132 | 180 |
| 24 | 164 | 212 |
| 25 | 196 | 228 |
| 26 | 212 | 260 |
| 27 | 260 | 292 |
| 28 | 276 | 324 |
| 29 | 308 | 340 |
| 30 | 340 | 372 |
| 31 | 356 | 404 |
| 32 | 388 | 420 |
| 33 | 420 | 452 |
| 34 | 436 | 484 |
| 35 | 468 | 500 |

700

| Channel Width | Ng | Superset of subcarrier indices (scidx) |
|---|---|---|
| 80MHz | 4 | -500,-496,...,-2,2,...,496,500 |
|  | 16 | -500,-484,...,-4,4,...,484,500 |

800

| RU Index | 20MHz Segment Duplication | |
|---|---|---|
| | S | E |
| 0 | -500 | -472 |
| 1 | -476 | -448 |
| 2 | -448 | -420 |
| 3 | -420 | -392 |
| 4 | -392 | -364 |
| 5 | -368 | -340 |
| 6 | -340 | -312 |
| 7 | -312 | -284 |
| 8 | -288 | -260 |
| 9 | -253 | -225 |
| 10 | -229 | -201 |
| 11 | -201 | -173 |
| 12 | -173 | -145 |
| 13 | -145 | -117 |
| 14 | -121 | -93 |
| 15 | -93 | -65 |
| 16 | -65 | -37 |
| 17 | -41 | -13 |
| Center Portion | -17 | 17 |
| 18 | 13 | 41 |
| 19 | 37 | 65 |
| 20 | 65 | 93 |
| 21 | 93 | 121 |
| 22 | 117 | 145 |
| 23 | 145 | 173 |
| 24 | 173 | 201 |
| 25 | 201 | 229 |
| 26 | 225 | 253 |
| 27 | 260 | 288 |
| 28 | 284 | 312 |
| 29 | 312 | 340 |
| 30 | 340 | 368 |
| 31 | 364 | 392 |
| 32 | 392 | 420 |
| 33 | 420 | 448 |
| 34 | 448 | 476 |
| 35 | 472 | 500 |

900

| RU Index | 20MHz Segment Duplication | |
| --- | --- | --- |
| | S | E |
| 0 | -500 | -468 |
| 1 | -484 | -436 |
| 2 | -452 | -420 |
| 3 | -420 | -388 |
| 4 | -404 | -356 |
| 5 | -372 | -340 |
| 6 | -340 | -308 |
| 7 | -324 | -276 |
| 8 | -292 | -260 |
| 9 | -253 | -221 |
| 10 | -237 | -189 |
| 11 | -205 | -173 |
| 12 | -173 | -141 |
| 13 | -157 | -109 |
| 14 | -125 | -93 |
| 15 | -93 | -61 |
| 16 | -77 | -29 |
| 17 | -45 | -13 |
| Center Portion | -20 | 20 |
| 18 | 13 | 45 |
| 19 | 29 | 77 |
| 20 | 61 | 93 |
| 21 | 93 | 125 |
| 22 | 109 | 157 |
| 23 | 141 | 173 |
| 24 | 173 | 205 |
| 25 | 189 | 237 |
| 26 | 221 | 253 |
| 27 | 260 | 292 |
| 28 | 276 | 324 |
| 29 | 308 | 340 |
| 30 | 340 | 372 |
| 31 | 356 | 404 |
| 32 | 388 | 420 |
| 33 | 420 | 452 |
| 34 | 436 | 484 |
| 35 | 468 | 500 |

| Channel Width | Ng | Superset of subcarrier indices (scidx) |
|---|---|---|
| 20MHz Segment Duplication | 4 | -500,-484,-260,-253,-249,-13,13,...,249,253,260,...,484,500 |
| | 16 | -500,-484,-260,-253,-237,-13,-4,4,13,237,253,260,...,484,500 |

1100

| RU Index 802.11be | RU Indices 802.11ax Ng = 4 | RU Indices 802.11ax Ng = 16 |
|---|---|---|
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9-10 | 9-10 |
| 10 | 10-11 | 10 |
| 11 | 11-12 | 11 |
| 12 | 12-13 | 12-13 |
| 13 | 13-14 | 13 |
| 14 | 14-15 | 14 |
| 15 | 15-16 | 15-16 |
| 16 | 16-17 | 16 |
| 17 | 17-18 | 17 |
| 18 | 18-19 | 19 |
| 19 | 19-20 | 20 |
| 20 | 20-21 | 20-21 |
| 21 | 21-22 | 22 |
| 22 | 22-23 | 23 |
| 23 | 23-24 | 23-24 |
| 24 | 24-25 | 25 |
| 25 | 25-26 | 26 |
| 26 | 26-27 | 26-27 |
| 27 | 28 | 28 |
| 28 | 29 | 29 |
| 29 | 30 | 30 |
| 30 | 31 | 31 |
| 31 | 32 | 32 |
| 32 | 33 | 33 |
| 33 | 34 | 34 |
| 34 | 35 | 35 |
| 35 | 36 | 36 |

| Channel Width | Ng | Subcarrier indices (scidx) |
|---|---|---|
| 160/80+80MHz | 48&16 | 80MHz(S1),80MHz(S2) |
| 240 | | 80MHz(S1),80MHz(S2),80MHz(S3) |
| 320 | | 80MHz(S1),80MHz(S2),80MHz(S3),80MHz(S4) |

Fig. 13    1300

Table T9

| Nr | Nc | Size of V (Nr x Nc) | Number of angles (Na) | The order of angles in the Compressed Beamforming Feedback Matrix Subfield |
|---|---|---|---|---|
| 9 | 1 | 9x1 | 16 | $T_{9-1} = (\phi_{11}, \phi_{21}, \phi_{31}, \phi_{41}, \phi_{51}, \phi_{61}, \phi_{71}, \phi_{81}, \phi_{21}, \phi_{31}, \phi_{41}, \phi_{51}, \phi_{61}, \phi_{71}, \phi_{81}, \phi_{91})$ |
| 9 | 2 | 9x2 | 30 | $T_{9-2} = T_{9-1} \cup (\phi_{22}, \phi_{32}, \phi_{42}, \phi_{52}, \phi_{62}, \phi_{72}, \phi_{82}, \phi_{32}, \phi_{42}, \phi_{52}, \phi_{62}, \phi_{72}, \phi_{82}, \phi_{92})$ $= (\phi_{11}, \phi_{21}, \phi_{31}, \phi_{41}, \phi_{51}, \phi_{61}, \phi_{71}, \phi_{81}, \phi_{21}, \phi_{31}, \phi_{41}, \phi_{51}, \phi_{61}, \phi_{71}, \phi_{81}, \phi_{91}, \phi_{22}, \phi_{32}, \phi_{42}, \phi_{52}, \phi_{62}, \phi_{72}, \phi_{82}, \phi_{92})$ |
| 9 | 3 | 9x3 | 42 | $T_{9-3} = T_{9-2} \cup (\phi_{33}, \phi_{43}, \phi_{53}, \phi_{63}, \phi_{73}, \phi_{83}, \phi_{43}, \phi_{53}, \phi_{63}, \phi_{73}, \phi_{83}, \phi_{93})$ |
| 9 | 4 | 9x4 | 52 | $T_{9-4} = T_{9-3} \cup (\phi_{44}, \phi_{54}, \phi_{64}, \phi_{74}, \phi_{84}, \phi_{54}, \phi_{64}, \phi_{74}, \phi_{84}, \phi_{94})$ |
| 9 | 5 | 9x5 | 60 | $T_{9-5} = T_{9-4} \cup (\phi_{55}, \phi_{65}, \phi_{75}, \phi_{85}, \phi_{65}, \phi_{75}, \phi_{85}, \phi_{95})$ |
| 9 | 6 | 9x6 | 66 | $T_{9-6} = T_{9-5} \cup (\phi_{66}, \phi_{76}, \phi_{86}, \phi_{76}, \phi_{86}, \phi_{96})$ |
| 9 | 7 | 9x7 | 70 | $T_{9-7} = T_{9-6} \cup (\phi_{77}, \phi_{87}, \phi_{87}, \phi_{97})$ |
| 9 | 8 | 9x8 | 72 | $T_{9-8} = T_{9-7} \cup (\phi_{88}, \phi_{98})$ |
| 9 | 9 | 9x9 | 72 | $T_{9-9} = T_{9-8}$ |

Table T10

| Nr | Nc | Size of V (Nr x Nc) | Number of angles (Na) | The order of angles in the Compressed Beamforming Feedback Matrix Subfield |
|---|---|---|---|---|
| 10 | 1 | 10x1 | 18 | $T_{10-1} = (\phi_{11}, \phi_{21}, \phi_{31}, \phi_{41}, \phi_{51}, \phi_{61}, \phi_{71}, \phi_{81}, \phi_{91}, \phi_{21}, \phi_{31}, \phi_{41}, \phi_{51}, \phi_{61}, \phi_{71}, \phi_{81}, \phi_{91}, \phi_{10-1})$ |
| 10 | 2 | 10x2 | 34 | $T_{10-2} = T_{10-1} \cup (\phi_{22}, \phi_{32}, \phi_{42}, \phi_{52}, \phi_{62}, \phi_{72}, \phi_{82}, \phi_{92}, \phi_{32}, \phi_{42}, \phi_{52}, \phi_{62}, \phi_{72}, \phi_{82}, \phi_{92}, \phi_{10-2})$ |
| 10 | 3 | 10x3 | 48 | $T_{10-3} = T_{10-2} \cup (\phi_{33}, \phi_{43}, \phi_{53}, \phi_{63}, \phi_{73}, \phi_{83}, \phi_{93}, \phi_{43}, \phi_{53}, \phi_{63}, \phi_{73}, \phi_{83}, \phi_{93}, \phi_{10-3})$ |
| 10 | 4 | 10x4 | 60 | $T_{10-4} = T_{10-3} \cup (\phi_{44}, \phi_{54}, \phi_{64}, \phi_{74}, \phi_{84}, \phi_{94}, \phi_{54}, \phi_{64}, \phi_{74}, \phi_{84}, \phi_{94}, \phi_{10-4})$ |
| 10 | 5 | 10x5 | 70 | $T_{10-5} = T_{10-4} \cup (\phi_{55}, \phi_{65}, \phi_{75}, \phi_{85}, \phi_{95}, \phi_{65}, \phi_{75}, \phi_{85}, \phi_{95}, \phi_{10-5})$ |
| 10 | 6 | 10x6 | 78 | $T_{10-6} = T_{10-5} \cup (\phi_{66}, \phi_{76}, \phi_{86}, \phi_{96}, \phi_{76}, \phi_{86}, \phi_{96}, \phi_{10-6})$ |
| 10 | 7 | 10x7 | 84 | $T_{10-7} = T_{10-6} \cup (\phi_{77}, \phi_{87}, \phi_{97}, \phi_{87}, \phi_{97}, \phi_{10-7})$ |
| 10 | 8 | 10x8 | 88 | $T_{10-8} = T_{10-7} \cup (\phi_{88}, \phi_{98}, \phi_{98}, \phi_{10-8})$ |
| 10 | 9 | 10x9 | 90 | $T_{10-9} = T_{10-8} \cup (\phi_{99}, \phi_{10-9})$ |
| 10 | 10 | 10x10 | 90 | $T_{10-10} = T_{10-9}$ |

Table T11a

| Nr | Nc | Size of V (Nr x Nc) | Number of angles (Na) | The order of angles in the Compressed Beamforming Feedback Matrix Subfield |
|---|---|---|---|---|
| 11 | 1 | 11x1 | 20 | $T_{11-1} = (\phi_{11}, \phi_{21}, \phi_{31}, \phi_{41}, \phi_{51}, \phi_{61}, \phi_{71}, \phi_{81}, \phi_{91}, \phi_{10-1},$ $\varphi_{21}, \varphi_{31}, \varphi_{41}, \varphi_{51}, \varphi_{61}, \varphi_{71}, \varphi_{81}, \varphi_{91}, \varphi_{10-1}, \varphi_{11-1})$ |
| 11 | 2 | 11x2 | 38 | $T_{11-2} = T_{11-1} \cup (\phi_{22}, \phi_{32}, \phi_{42}, \phi_{52}, \phi_{62}, \phi_{72}, \phi_{82}, \phi_{92}, \phi_{10-2},$ $\varphi_{32}, \varphi_{42}, \varphi_{52}, \varphi_{62}, \varphi_{72}, \varphi_{82}, \varphi_{92}, \varphi_{10-2}, \varphi_{11-2})$ |
| 11 | 3 | 11x3 | 54 | $T_{11-3} = T_{11-2} \cup (\phi_{33}, \phi_{43}, \phi_{53}, \phi_{63}, \phi_{73}, \phi_{83}, \phi_{93}, \phi_{10-3},$ $\varphi_{43}, \varphi_{53}, \varphi_{63}, \varphi_{73}, \varphi_{83}, \varphi_{93}, \varphi_{10-3}, \varphi_{11-3})$ |
| 11 | 4 | 11x4 | 68 | $T_{11-4} = T_{11-3} \cup (\phi_{44}, \phi_{54}, \phi_{64}, \phi_{74}, \phi_{84}, \phi_{94}, \phi_{10-4},$ $\varphi_{54}, \varphi_{64}, \varphi_{74}, \varphi_{84}, \varphi_{94}, \varphi_{10-4}, \varphi_{11-4})$ |
| 11 | 5 | 11x5 | 80 | $T_{11-5} = T_{11-4} \cup (\phi_{55}, \phi_{65}, \phi_{75}, \phi_{85}, \phi_{95}, \phi_{10-5},$ $\varphi_{65}, \varphi_{75}, \varphi_{85}, \varphi_{95}, \varphi_{10-5}, \varphi_{11-5})$ |
| 11 | 6 | 11x6 | 90 | $T_{11-6} = T_{11-5} \cup (\phi_{66}, \phi_{76}, \phi_{86}, \phi_{96}, \phi_{10-6}, \varphi_{76}, \varphi_{86}, \varphi_{96}, \varphi_{10-6}, \varphi_{11-6})$ |
| 11 | 7 | 11x7 | 98 | $T_{11-7} = T_{11-6} \cup (\phi_{77}, \phi_{87}, \phi_{97}, \phi_{10-7}, \varphi_{87}, \varphi_{97}, \varphi_{10-7}, \varphi_{11-7})$ |
| 11 | 8 | 11x8 | 104 | $T_{11-8} = T_{11-7} \cup (\phi_{88}, \phi_{98}, \phi_{10-8}, \varphi_{98}, \varphi_{10-8}, \varphi_{11-8})$ |
| 11 | 9 | 11x9 | 108 | $T_{11-9} = T_{11-8} \cup (\phi_{99}, \phi_{10-9}, \varphi_{10-9}, \varphi_{11-9})$ |

Table T11b

| Nr | Nc | Size of V (Nr x Nc) | Number of angles (Na) | The order of angles in the Compressed Beamforming Feedback Matrix Subfield |
|----|----|----|----|----|
| 11 | 10 | 11x10 | 110 | $T_{11-10} = T_{11-9} \cup (\phi_{10-10}, \varphi_{11-10})$ |
| 11 | 11 | 11x11 | 110 | $T_{11-11} = T_{11-10}$ |

Table T12a

| Nr | Nc | Size of V (Nr x Nc) | Number of angles (Na) | The order of angles in the Compressed Beamforming Feedback Matrix Subfield |
|---|---|---|---|---|
| 12 | 1 | 12x1 | 22 | $T_{12-1} = (\phi_{11}, \phi_{21}, \phi_{31}, \phi_{41}, \phi_{51}, \phi_{61}, \phi_{71}, \phi_{81}, \phi_{91}, \phi_{10-1}, \phi_{11-1}, \phi_{21}, \phi_{31}, \phi_{41}, \phi_{51}, \phi_{61}, \phi_{71}, \phi_{81}, \phi_{91}, \phi_{10-1}, \phi_{11-1}, \phi_{12-1})$ |
| 12 | 2 | 12x2 | 42 | $T_{12-2} = T_{12-1} \cup (\phi_{22}, \phi_{32}, \phi_{42}, \phi_{52}, \phi_{62}, \phi_{72}, \phi_{82}, \phi_{92}, \phi_{10-2}, \phi_{11-2}, \phi_{32}, \phi_{42}, \phi_{52}, \phi_{62}, \phi_{72}, \phi_{82}, \phi_{92}, \phi_{10-2}, \phi_{11-2}, \phi_{12-2})$ |
| 12 | 3 | 12x3 | 60 | $T_{12-3} = T_{12-2} \cup (\phi_{33}, \phi_{43}, \phi_{53}, \phi_{63}, \phi_{73}, \phi_{83}, \phi_{93}, \phi_{10-3}, \phi_{11-3}, \phi_{43}, \phi_{53}, \phi_{63}, \phi_{73}, \phi_{83}, \phi_{93}, \phi_{10-3}, \phi_{11-3}, \phi_{12-3})$ |
| 12 | 4 | 12x4 | 76 | $T_{12-4} = T_{12-3} \cup (\phi_{44}, \phi_{54}, \phi_{64}, \phi_{74}, \phi_{84}, \phi_{94}, \phi_{10-4}, \phi_{11-4}, \phi_{54}, \phi_{64}, \phi_{74}, \phi_{84}, \phi_{94}, \phi_{10-4}, \phi_{11-4}, \phi_{12-4})$ |
| 12 | 5 | 12x5 | 90 | $T_{12-5} = T_{12-4} \cup (\phi_{55}, \phi_{65}, \phi_{75}, \phi_{85}, \phi_{95}, \phi_{10-5}, \phi_{11-5}, \phi_{65}, \phi_{75}, \phi_{85}, \phi_{95}, \phi_{10-5}, \phi_{11-5}, \phi_{12-5})$ |
| 12 | 6 | 12x6 | 102 | $T_{12-6} = T_{12-5} \cup (\phi_{66}, \phi_{76}, \phi_{86}, \phi_{96}, \phi_{10-6}, \phi_{11-6}, \phi_{76}, \phi_{86}, \phi_{96}, \phi_{10-6}, \phi_{11-6}, \phi_{12-6})$ |
| 12 | 7 | 12x7 | 112 | $T_{12-7} = T_{12-6} \cup (\phi_{77}, \phi_{87}, \phi_{97}, \phi_{10-7}, \phi_{11-7}, \phi_{87}, \phi_{97}, \phi_{10-7}, \phi_{11-7}, \phi_{12-7})$ |
| 12 | 8 | 12x8 | 120 | $T_{12-8} = T_{12-7} \cup (\phi_{88}, \phi_{98}, \phi_{10-8}, \phi_{11-8}, \phi_{98}, \phi_{10-8}, \phi_{11-8}, \phi_{12-8})$ |

Table T12b

| Nr | Nc | Size of V (Nr x Nc) | Number of angles (Na) | The order of angles in the Compressed Beamforming Feedback Matrix Subfield |
|----|----|----|----|----|
| 12 | 9 | 12x9 | 126 | $T_{12-9} = T_{12-8} \cup (\phi_{99}, \phi_{10-9}, \phi_{11-9}, \phi_{10-9}, \phi_{11-9}, \varphi_{12-9})$ |
| 12 | 10 | 12x10 | 130 | $T_{12-10} = T_{12-9} \cup (\phi_{10-10}, \phi_{11-10}, \phi_{11-10}, \varphi_{12-10})$ |
| 12 | 11 | 12x11 | 132 | $T_{12-11} = T_{12-10} \cup (\phi_{11-11}, \varphi_{12-11})$ |
| 12 | 12 | 12x12 | 132 | $T_{12-12} = T_{12-11}$ |

Table T13a

| Nr | Nc | Size of V (Nr x Nc) | Number of angles (Na) | The order of angles in the Compressed Beamforming Feedback Matrix Subfield |
|---|---|---|---|---|
| 13 | 1 | 13x1 | 24 | $T_{13-1} = (\phi_{11}, \phi_{21}, \phi_{31}, \phi_{41}, \phi_{51}, \phi_{61}, \phi_{71}, \phi_{81}, \phi_{91}, \phi_{10-1}, \phi_{11-1}, \phi_{12-1}, \phi_{21}, \phi_{31}, \phi_{41}, \phi_{51}, \phi_{61}, \phi_{71}, \phi_{81}, \phi_{91}, \phi_{10-1}, \phi_{11-1}, \phi_{12-1}, \phi_{13-1})$ |
| 13 | 2 | 13x2 | 46 | $T_{13-2} = T_{13-1} \cup (\phi_{22}, \phi_{32}, \phi_{42}, \phi_{52}, \phi_{62}, \phi_{72}, \phi_{82}, \phi_{92}, \phi_{10-2}, \phi_{11-2}, \phi_{12-2}, \phi_{32}, \phi_{42}, \phi_{52}, \phi_{62}, \phi_{72}, \phi_{82}, \phi_{92}, \phi_{10-2}, \phi_{11-2}, \phi_{12-2}, \phi_{13-2})$ |
| 13 | 3 | 13x3 | 66 | $T_{13-3} = T_{13-2} \cup (\phi_{33}, \phi_{43}, \phi_{53}, \phi_{63}, \phi_{73}, \phi_{83}, \phi_{93}, \phi_{10-3}, \phi_{11-3}, \phi_{12-3}, \phi_{43}, \phi_{53}, \phi_{63}, \phi_{73}, \phi_{83}, \phi_{93}, \phi_{10-3}, \phi_{11-3}, \phi_{12-3}, \phi_{13-3})$ |
| 13 | 4 | 13x4 | 84 | $T_{13-4} = T_{13-3} \cup (\phi_{44}, \phi_{54}, \phi_{64}, \phi_{74}, \phi_{84}, \phi_{94}, \phi_{10-4}, \phi_{11-4}, \phi_{12-4}, \phi_{54}, \phi_{64}, \phi_{74}, \phi_{84}, \phi_{94}, \phi_{10-4}, \phi_{11-4}, \phi_{12-4}, \phi_{13-4})$ |
| 13 | 5 | 13x5 | 100 | $T_{13-5} = T_{13-4} \cup (\phi_{55}, \phi_{65}, \phi_{75}, \phi_{85}, \phi_{95}, \phi_{10-5}, \phi_{11-5}, \phi_{12-5}, \phi_{65}, \phi_{75}, \phi_{85}, \phi_{95}, \phi_{10-5}, \phi_{11-5}, \phi_{12-5}, \phi_{13-5})$ |
| 13 | 6 | 13x6 | 114 | $T_{13-6} = T_{13-5} \cup (\phi_{66}, \phi_{76}, \phi_{86}, \phi_{96}, \phi_{10-6}, \phi_{11-6}, \phi_{12-6}, \phi_{76}, \phi_{86}, \phi_{96}, \phi_{10-6}, \phi_{11-6}, \phi_{12-6}, \phi_{13-6})$ |
| 13 | 7 | 13x7 | 126 | $T_{13-7} = T_{13-6} \cup (\phi_{77}, \phi_{87}, \phi_{97}, \phi_{10-7}, \phi_{11-7}, \phi_{12-7}, \phi_{87}, \phi_{97}, \phi_{10-7}, \phi_{11-7}, \phi_{12-7}, \phi_{13-7})$ |

Table T13b

| Nr | Nc | Size of V (Nr x Nc) | Number of angles (Na) | The order of angles in the Compressed Beamforming Feedback Matrix Subfield |
|----|----|---------------------|------------------------|----------------------------------------------------------------------------|
| 13 | 8  | 13x8  | 136 | $T_{13-8} = T_{13-7} \cup (\phi_{88}, \phi_{98}, \phi_{10-8}, \phi_{11-8}, \phi_{12-8}, \varphi_{98}, \varphi_{10-8}, \varphi_{11-8}, \varphi_{12-8}, \varphi_{13-8})$ |
| 13 | 9  | 13x9  | 144 | $T_{13-9} = T_{13-8} \cup (\phi_{99}, \phi_{10-9}, \phi_{11-9}, \phi_{12-9}, \varphi_{10-9}, \varphi_{11-9}, \varphi_{12-9}, \varphi_{13-9})$ |
| 13 | 10 | 13x10 | 150 | $T_{13-10} = T_{13-9} \cup (\phi_{10-10}, \phi_{11-10}, \phi_{12-10}, \varphi_{11-10}, \varphi_{12-10}, \varphi_{13-10})$ |
| 13 | 11 | 13x11 | 154 | $T_{13-11} = T_{13-10} \cup (\phi_{11-11}, \phi_{12-11}, \varphi_{12-11}, \varphi_{13-11})$ |
| 13 | 12 | 13x12 | 156 | $T_{13-12} = T_{13-11} \cup (\phi_{12-12}, \varphi_{13-12})$ |
| 13 | 13 | 13x13 | 156 | $T_{13-13} = T_{13-12}$ |

Table T14a

| Nr | Nc | Size of V (Nr x Nc) | Number of angles (Na) | The order of angles in the Compressed Beamforming Feedback Matrix Subfield |
|---|---|---|---|---|
| 14 | 1 | 14x1 | 26 | $T_{14-1} = (\phi_{11}, \phi_{21}, \phi_{31}, \phi_{41}, \phi_{51}, \phi_{61}, \phi_{71}, \phi_{81}, \phi_{91}, \phi_{10-1}, \phi_{11-1}, \phi_{12-1}, \phi_{13-1}, \varphi_{21}, \varphi_{31}, \varphi_{41}, \varphi_{51}, \varphi_{61}, \varphi_{71}, \varphi_{81}, \varphi_{91}, \varphi_{10-1}, \varphi_{11-1}, \varphi_{12-1}, \varphi_{13-1}, \varphi_{14-1})$ |
| 14 | 2 | 14x2 | 50 | $T_{14-2} = T_{14-1} \cup (\phi_{22}, \phi_{32}, \phi_{42}, \phi_{52}, \phi_{62}, \phi_{72}, \phi_{82}, \phi_{92}, \phi_{10-2}, \phi_{11-2}, \phi_{12-2}, \phi_{13-2}, \varphi_{32}, \varphi_{42}, \varphi_{52}, \varphi_{62}, \varphi_{72}, \varphi_{82}, \varphi_{92}, \varphi_{10-2}, \varphi_{11-2}, \varphi_{12-2}, \varphi_{13-2}, \varphi_{14-2})$ |
| 14 | 3 | 14x3 | 72 | $T_{14-3} = T_{14-2} \cup (\phi_{33}, \phi_{43}, \phi_{53}, \phi_{63}, \phi_{73}, \phi_{83}, \phi_{93}, \phi_{10-3}, \phi_{11-3}, \phi_{12-3}, \phi_{13-3}, \varphi_{43}, \varphi_{53}, \varphi_{63}, \varphi_{73}, \varphi_{83}, \varphi_{93}, \varphi_{10-3}, \varphi_{11-3}, \varphi_{12-3}, \varphi_{13-3}, \varphi_{14-3})$ |
| 14 | 4 | 14x4 | 92 | $T_{14-4} = T_{14-3} \cup (\phi_{44}, \phi_{54}, \phi_{64}, \phi_{74}, \phi_{84}, \phi_{94}, \phi_{10-4}, \phi_{11-4}, \phi_{12-4}, \phi_{13-4}, \varphi_{54}, \varphi_{64}, \varphi_{74}, \varphi_{84}, \varphi_{94}, \varphi_{10-4}, \varphi_{11-4}, \varphi_{12-4}, \varphi_{13-4}, \varphi_{14-4})$ |
| 14 | 5 | 14x5 | 110 | $T_{14-5} = T_{14-4} \cup (\phi_{55}, \phi_{65}, \phi_{75}, \phi_{85}, \phi_{95}, \phi_{10-5}, \phi_{11-5}, \phi_{12-5}, \phi_{13-5}, \varphi_{65}, \varphi_{75}, \varphi_{85}, \varphi_{95}, \varphi_{10-5}, \varphi_{11-5}, \varphi_{12-5}, \varphi_{13-5}, \varphi_{14-5})$ |
| 14 | 6 | 14x6 | 126 | $T_{14-6} = T_{14-5} \cup (\phi_{66}, \phi_{76}, \phi_{86}, \phi_{96}, \phi_{10-6}, \phi_{11-6}, \phi_{12-6}, \phi_{13-6}, \varphi_{76}, \varphi_{86}, \varphi_{96}, \varphi_{10-6}, \varphi_{11-6}, \varphi_{12-6}, \varphi_{13-6}, \varphi_{14-6})$ |
| 14 | 7 | 14x7 | 140 | $T_{14-7} = T_{14-6} \cup (\phi_{77}, \phi_{87}, \phi_{97}, \phi_{10-7}, \phi_{11-7}, \phi_{12-7}, \phi_{13-7}, \varphi_{87}, \varphi_{97}, \varphi_{10-7}, \varphi_{11-7}, \varphi_{12-7}, \varphi_{13-7}, \varphi_{14-7})$ |

Table T14b

| Nr | Nc | Size of V (Nr x Nc) | Number of angles (Na) | The order of angles in the Compressed Beamforming Feedback Matrix Subfield |
|---|---|---|---|---|
| 14 | 8 | 14x8 | 152 | $T_{14-8} = T_{14-7} \cup (\phi_{88}, \phi_{98}, \phi_{10-8}, \phi_{11-8}, \phi_{12-8}, \phi_{13-8}, \varphi_{98}, \varphi_{10-8}, \varphi_{11-8}, \varphi_{12-8}, \varphi_{13-8}, \varphi_{14-8})$ |
| 14 | 9 | 14x9 | 162 | $T_{14-9} = T_{14-8} \cup (\phi_{99}, \phi_{10-9}, \phi_{11-9}, \phi_{12-9}, \phi_{13-9}, \varphi_{10-9}, \varphi_{11-9}, \varphi_{12-9}, \varphi_{13-9}, \varphi_{14-9})$ |
| 14 | 10 | 14x10 | 170 | $T_{14-10} = T_{14-9} \cup (\phi_{10-10}, \phi_{11-10}, \phi_{12-10}, \phi_{13-10}, \varphi_{11-10}, \varphi_{12-10}, \varphi_{13-10}, \varphi_{14-10})$ |
| 14 | 11 | 14x11 | 176 | $T_{14-11} = T_{14-10} \cup (\phi_{11-11}, \phi_{12-11}, \phi_{13-11}, \varphi_{12-11}, \varphi_{13-11}, \varphi_{14-11})$ |
| 14 | 12 | 14x12 | 180 | $T_{14-12} = T_{14-11} \cup (\phi_{12-12}, \phi_{13-12}, \varphi_{13-12}, \varphi_{14-12})$ |
| 14 | 13 | 14x13 | 182 | $T_{14-13} = T_{14-12} \cup (\phi_{13-13}, \varphi_{14-13})$ |
| 14 | 14 | 14x14 | 182 | $T_{14-14} = T_{14-13}$ |

Table T15a

| Nr | Nc | Size of V (Nr x Nc) | Number of angles (Na) | The order of angles in the Compressed Beamforming Feedback Matrix Subfield |
|---|---|---|---|---|
| 15 | 1 | 15x1 | 28 | $T_{15-1} = (\phi_{11}, \phi_{21}, \phi_{31}, \phi_{41}, \phi_{51}, \phi_{61}, \phi_{71}, \phi_{81}, \phi_{91}, \phi_{10-1}, \phi_{11-1}, \phi_{12-1}, \phi_{13-1}, \phi_{14-1}, \psi_{21}, \psi_{31}, \psi_{41}, \psi_{51}, \psi_{61}, \psi_{71}, \psi_{81}, \psi_{91}, \psi_{10-1}, \psi_{11-1}, \psi_{12-1}, \psi_{13-1}, \psi_{14-1}, \psi_{15-1})$ |
| 15 | 2 | 15x2 | 54 | $T_{15-2} = T_{15-1} \cup (\phi_{22}, \phi_{32}, \phi_{42}, \phi_{52}, \phi_{62}, \phi_{72}, \phi_{82}, \phi_{92}, \phi_{10-2}, \phi_{11-2}, \phi_{12-2}, \phi_{13-2}, \phi_{14-2}, \psi_{32}, \psi_{42}, \psi_{52}, \psi_{62}, \psi_{72}, \psi_{82}, \psi_{92}, \psi_{10-2}, \psi_{11-2}, \psi_{12-2}, \psi_{13-2}, \psi_{14-2}, \psi_{15-2})$ |
| 15 | 3 | 15x3 | 78 | $T_{15-3} = T_{15-2} \cup (\phi_{33}, \phi_{43}, \phi_{53}, \phi_{63}, \phi_{73}, \phi_{83}, \phi_{93}, \phi_{10-3}, \phi_{11-3}, \phi_{12-3}, \phi_{13-3}, \phi_{14-3}, \psi_{43}, \psi_{53}, \psi_{63}, \psi_{73}, \psi_{83}, \psi_{93}, \psi_{10-3}, \psi_{11-3}, \psi_{12-3}, \psi_{13-3}, \psi_{14-3}, \psi_{15-3})$ |
| 15 | 4 | 15x4 | 100 | $T_{15-4} = T_{15-3} \cup (\phi_{44}, \phi_{54}, \phi_{64}, \phi_{74}, \phi_{84}, \phi_{94}, \phi_{10-4}, \phi_{11-4}, \phi_{12-4}, \phi_{13-4}, \phi_{14-4}, \psi_{54}, \psi_{64}, \psi_{74}, \psi_{84}, \psi_{94}, \psi_{10-4}, \psi_{11-4}, \psi_{12-4}, \psi_{13-4}, \psi_{14-4}, \psi_{15-4})$ |
| 15 | 5 | 15x5 | 120 | $T_{15-5} = T_{15-4} \cup (\phi_{55}, \phi_{65}, \phi_{75}, \phi_{85}, \phi_{95}, \phi_{10-5}, \phi_{11-5}, \phi_{12-5}, \phi_{13-5}, \phi_{14-5}, \psi_{65}, \psi_{75}, \psi_{85}, \psi_{95}, \psi_{10-5}, \psi_{11-5}, \psi_{12-5}, \psi_{13-5}, \psi_{14-5}, \psi_{15-5})$ |
| 15 | 6 | 15x6 | 138 | $T_{15-6} = T_{15-5} \cup (\phi_{66}, \phi_{76}, \phi_{86}, \phi_{96}, \phi_{10-6}, \phi_{11-6}, \phi_{12-6}, \phi_{13-6}, \phi_{14-6}, \psi_{76}, \psi_{86}, \psi_{96}, \psi_{10-6}, \psi_{11-6}, \psi_{12-6}, \psi_{13-6}, \psi_{14-6}, \psi_{15-6})$ |

Table T15b

| Nr | Nc | Size of V (Nr x Nc) | Number of angles (Na) | The order of angles in the Compressed Beamforming Feedback Matrix Subfield |
|---|---|---|---|---|
| 15 | 7 | 15x7 | 154 | $T_{15-7} = T_{15-6} \cup (\phi_{77}, \phi_{87}, \phi_{97}, \phi_{10-7}, \phi_{11-7}, \phi_{12-7}, \phi_{13-7}, \phi_{14-7}, \phi_{87}, \phi_{97}, \phi_{10-7}, \phi_{11-7}, \phi_{12-7}, \phi_{13-7}, \phi_{14-7}, \phi_{15-7})$ |
| 15 | 8 | 15x8 | 168 | $T_{15-8} = T_{15-7} \cup (\phi_{88}, \phi_{98}, \phi_{10-8}, \phi_{11-8}, \phi_{12-8}, \phi_{13-8}, \phi_{14-8}, \phi_{99}, \phi_{10-8}, \phi_{11-8}, \phi_{12-8}, \phi_{13-8}, \phi_{14-8}, \phi_{15-8})$ |
| 15 | 9 | 15x9 | 180 | $T_{15-9} = T_{15-8} \cup (\phi_{99}, \phi_{10-9}, \phi_{11-9}, \phi_{12-9}, \phi_{13-9}, \phi_{14-9}, \phi_{10-9}, \phi_{11-9}, \phi_{12-9}, \phi_{13-9}, \phi_{14-9}, \phi_{15-9})$ |
| 15 | 10 | 15x10 | 190 | $T_{15-10} = T_{15-9} \cup (\phi_{10-10}, \phi_{11-10}, \phi_{12-10}, \phi_{13-10}, \phi_{14-10}, \phi_{11-10}, \phi_{12-10}, \phi_{13-10}, \phi_{14-10}, \phi_{15-10})$ |
| 15 | 11 | 15x11 | 198 | $T_{15-11} = T_{15-10} \cup (\phi_{11-11}, \phi_{12-11}, \phi_{13-11}, \phi_{14-11}, \phi_{12-11}, \phi_{13-11}, \phi_{14-11}, \phi_{15-11})$ |
| 15 | 12 | 15x12 | 204 | $T_{15-12} = T_{15-11} \cup (\phi_{12-12}, \phi_{13-12}, \phi_{14-12}, \phi_{13-12}, \phi_{14-12}, \phi_{15-12})$ |
| 15 | 13 | 15x13 | 208 | $T_{15-13} = T_{15-12} \cup (\phi_{13-13}, \phi_{14-13}, \phi_{14-13}, \phi_{15-13})$ |
| 15 | 14 | 15x14 | 210 | $T_{15-14} = T_{15-13} \cup (\phi_{14-14}, \phi_{15-14})$ |
| 15 | 15 | 15x15 | 210 | $T_{15-15} = T_{15-14}$ |

Table T16a

| Nr | Nc | Size of V (Nr x Nc) | Number of angles (Na) | The order of angles in the Compressed Beamforming Feedback Matrix Subfield |
|---|---|---|---|---|
| 16 | 1 | 16x1 | 30 | $T_{16-1} = (\phi_{11}, \phi_{21}, \phi_{31}, \phi_{41}, \phi_{51}, \phi_{61}, \phi_{71}, \phi_{81}, \phi_{91}, \phi_{10-1}, \phi_{11-1}, \phi_{12-1}, \phi_{13-1}, \phi_{14-1}, \phi_{15-1}, \psi_{21}, \psi_{31}, \psi_{41}, \psi_{51}, \psi_{61}, \psi_{71}, \psi_{81}, \psi_{91}, \psi_{10-1}, \psi_{12-1}, \psi_{13-1}, \psi_{14-1}, \psi_{15-1}, \psi_{16-1})$ |
| 16 | 2 | 16x2 | 58 | $T_{16-2} = T_{16-1} \cup (\phi_{22}, \phi_{32}, \phi_{42}, \phi_{52}, \phi_{62}, \phi_{72}, \phi_{82}, \phi_{92}, \phi_{10-2}, \phi_{11-2}, \phi_{12-2}, \phi_{13-2}, \phi_{14-2}, \phi_{15-2}, \psi_{32}, \psi_{42}, \psi_{52}, \psi_{62}, \psi_{72}, \psi_{82}, \psi_{92}, \psi_{10-2}, \psi_{12-2}, \psi_{13-2}, \psi_{14-2}, \psi_{15-2}, \psi_{16-2})$ |
| 16 | 3 | 16x3 | 84 | $T_{16-3} = T_{16-2} \cup (\phi_{33}, \phi_{43}, \phi_{53}, \phi_{63}, \phi_{73}, \phi_{83}, \phi_{93}, \phi_{10-3}, \phi_{11-3}, \phi_{12-3}, \phi_{13-3}, \phi_{14-3}, \phi_{15-3}, \psi_{43}, \psi_{53}, \psi_{63}, \psi_{73}, \psi_{83}, \psi_{93}, \psi_{10-3}, \psi_{11-3}, \psi_{12-3}, \psi_{13-3}, \psi_{14-3}, \psi_{15-3}, \psi_{16-3})$ |
| 16 | 4 | 16x4 | 108 | $T_{16-4} = T_{16-3} \cup (\phi_{44}, \phi_{54}, \phi_{64}, \phi_{74}, \phi_{84}, \phi_{94}, \phi_{10-4}, \phi_{11-4}, \phi_{12-4}, \phi_{13-4}, \phi_{14-4}, \phi_{15-4}, \psi_{54}, \psi_{64}, \psi_{74}, \psi_{84}, \psi_{94}, \psi_{10-4}, \psi_{11-4}, \psi_{12-4}, \psi_{13-4}, \psi_{14-4}, \psi_{15-4}, \psi_{16-4})$ |
| 16 | 5 | 16x5 | 130 | $T_{16-5} = T_{16-4} \cup (\phi_{55}, \phi_{65}, \phi_{75}, \phi_{85}, \phi_{95}, \phi_{10-5}, \phi_{11-5}, \phi_{12-5}, \phi_{13-5}, \phi_{14-5}, \phi_{15-5}, \psi_{65}, \psi_{75}, \psi_{85}, \psi_{95}, \psi_{10-5}, \psi_{11-5}, \psi_{12-5}, \psi_{13-5}, \psi_{14-5}, \psi_{15-5}, \psi_{16-5})$ |

Table T16b

| Nr | Nc | Size of V (Nr x Nc) | Number of angles (Na) | The order of angles in the Compressed Beamforming Feedback Matrix Subfield |
|----|----|---------------------|------------------------|----------------------------------------------------------------------------|
| 16 | 6  | 16x6  | 150 | $T_{16-6} = T_{16-5} \cup (\phi_{66}, \phi_{76}, \phi_{86}, \phi_{96}, \phi_{10-6}, \phi_{11-6}, \phi_{12-6}, \phi_{13-6}, \phi_{14-6}, \phi_{15-6}, \varphi_{76}, \varphi_{86}, \varphi_{96}, \varphi_{10-6}, \varphi_{11-6}, \varphi_{12-6}, \varphi_{13-6}, \varphi_{14-6}, \varphi_{15-6}, \varphi_{16-6})$ |
| 16 | 7  | 16x7  | 168 | $T_{16-7} = T_{16-6} \cup (\phi_{77}, \phi_{87}, \phi_{97}, \phi_{10-7}, \phi_{11-7}, \phi_{12-7}, \phi_{13-7}, \phi_{14-7}, \phi_{15-7}, \varphi_{87}, \varphi_{97}, \varphi_{10-7}, \varphi_{11-7}, \varphi_{12-7}, \varphi_{13-7}, \varphi_{14-7}, \varphi_{15-7}, \varphi_{16-7})$ |
| 16 | 8  | 16x8  | 184 | $T_{16-8} = T_{16-7} \cup (\phi_{88}, \phi_{98}, \phi_{10-8}, \phi_{11-8}, \phi_{12-8}, \phi_{13-8}, \phi_{14-8}, \phi_{15-8}, \varphi_{98}, \varphi_{10-8}, \varphi_{11-8}, \varphi_{12-8}, \varphi_{13-8}, \varphi_{14-8}, \varphi_{15-8}, \varphi_{16-8})$ |
| 16 | 9  | 16x9  | 198 | $T_{16-9} = T_{16-8} \cup (\phi_{99}, \phi_{10-9}, \phi_{11-9}, \phi_{12-9}, \phi_{13-9}, \phi_{14-9}, \phi_{15-9}, \varphi_{10-9}, \varphi_{11-9}, \varphi_{12-9}, \varphi_{13-9}, \varphi_{14-9}, \varphi_{15-9}, \varphi_{16-9})$ |
| 16 | 10 | 16x10 | 210 | $T_{16-10} = T_{16-9} \cup (\phi_{10-10}, \phi_{11-10}, \phi_{12-10}, \phi_{13-10}, \phi_{14-10}, \phi_{15-10}, \varphi_{11-10}, \varphi_{12-10}, \varphi_{13-10}, \varphi_{14-10}, \varphi_{15-10}, \varphi_{16-10})$ |
| 16 | 11 | 16x11 | 220 | $T_{16-11} = T_{16-10} \cup (\phi_{11-11}, \phi_{12-11}, \phi_{13-11}, \phi_{14-11}, \phi_{15-11}, \varphi_{12-11}, \varphi_{13-11}, \varphi_{14-11}, \varphi_{15-11}, \varphi_{16-11})$ |

Table T16c

| Nr | Nc | Size of V (Nr x Nc) | Number of angles (Na) | The order of angles in the Compressed Beamforming Feedback Matrix Subfield |
|----|----|---------------------|-----------------------|------------------------------------------------------------------------------|
| 16 | 12 | 16x12 | 228 | $T_{16-12} = T_{16-11} \cup (\phi_{12-12}, \phi_{13-12}, \phi_{14-12}, \phi_{15-12}, \phi_{13-12}, \phi_{14-12}, \phi_{15-12}, \phi_{16-12})$ |
| 16 | 13 | 16x13 | 234 | $T_{16-13} = T_{16-12} \cup (\phi_{13-13}, \phi_{14-13}, \phi_{15-13}, \phi_{14-13}, \phi_{15-13}, \phi_{16-13})$ |
| 16 | 14 | 16x14 | 238 | $T_{16-14} = T_{16-13} \cup (\phi_{14-14}, \phi_{15-14}, \phi_{15-14}, \phi_{16-14})$ |
| 16 | 15 | 16x15 | 240 | $T_{16-15} = T_{16-14} \cup (\phi_{15-15}, \phi_{16-15})$ |
| 16 | 16 | 16x16 | 240 | $T_{16-16} = T_{16-15}$ |

2900

2901 transmitting a report of
beamforming information
to a beamformer device

Figure 31:
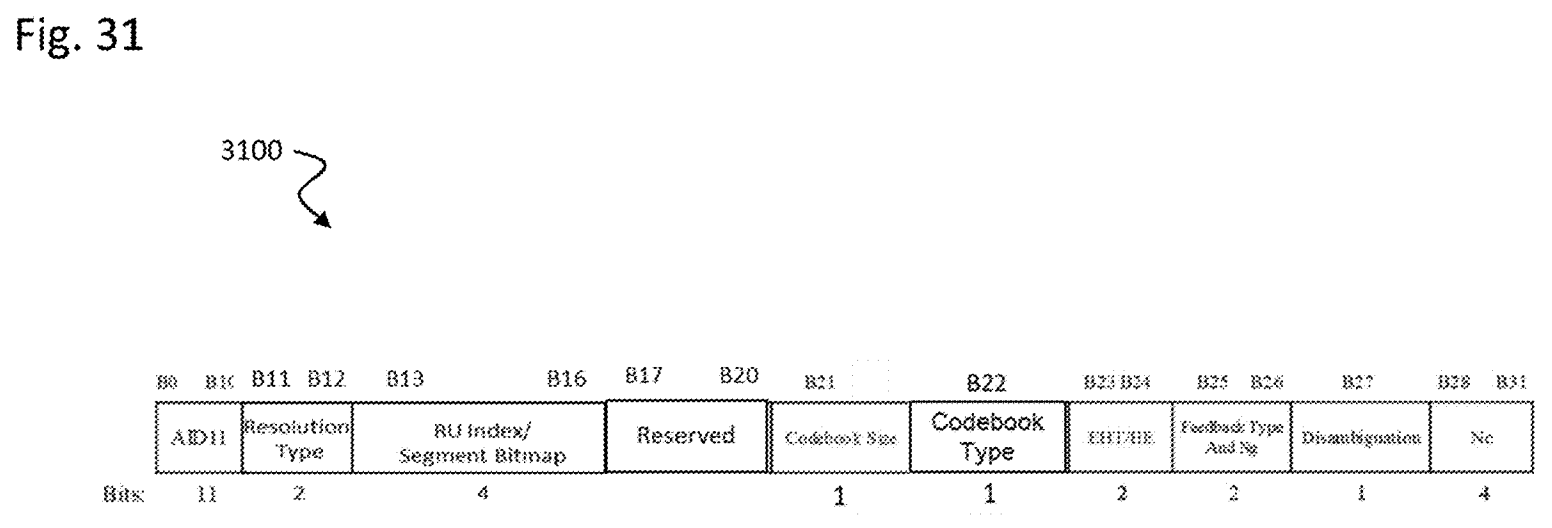

| AID11 | Resolution Type | RU Index/ Segment Bitmap | Reserved | Codebook Size | Codebook Type | SRBTREE | Feedback Type And Ng | Disambiguation | Nc |
|---|---|---|---|---|---|---|---|---|---|
| 11 | 2 | 4 | | 1 | 1 | 2 | 2 | 1 | 4 |

B8 B9 B11 B12 B13    B16   B17   B20   B21   B22   B23 B24   B25 B26   B27   B29 B30 B31

Bits

TECHNIQUES FOR BEAMFORMING

CROSS-REFERENCE TO RELATED APPLICATIONS

This application is a continuation of U.S. patent application Ser. No. 18/171,223, filed Feb. 17, 2023, which is a continuation of International Application No. PCT/EP2020/073109, filed on Aug. 18, 2020. All of the afore-mentioned patent applications are hereby incorporated by reference in their entireties.

TECHNICAL FIELD

The present disclosure relates to techniques for Beamforming. The disclosure particularly relates to a beamformer device transmitting a request with a set of sounding tone indices to a beamformee device, and a beamformee device transmitting a report of beamforming information to a beamformer device. The disclosure further relates to a beamformer device receiving a beamforming report from a beamformee device.

BACKGROUND

Compressed Beamforming Report is part of sounding procedure, defined for transmission of beamforming information from beamformee to beamformer. It is used by IEEE 802.11n/ac/ax versions of WiFi standard, also known as 11n, 11ac, 11ax. Compressed Beamforming Report consists of MIMO (Multiple-Input Multiple-Output) Control Field that defines various parameters indication (e.g. Nc, Ng, Code-book size), general feedback information (e.g. average SNR (signal-to-noise ratio) per stream) and per-tone compressed data which includes precoder matrix and per-tone SNR (for MU (multi-user) feedback type).

Starting from 801.11ax sounding may be performed on the entire bandwidth (BW) or part of the BW (single or multiple Resource Allocations-RUs (Resource Units)). Thus, specific set of tone (subcarrier) indices is defined for sounding of every portion of the supported BW.

IEEE 802.11be, also known as 11be or WiFi6, introduces a larger BW and larger MIMO size, which require updated feedback parameters, frame format and also an exact definition of compressed precoder matrix and SNR. Moreover, 802.11be introduces a new tone plan (i.e. a structure of frequency division to basic units, RUs) which implies different tone definition to be applied for sounding as well.

SUMMARY

It is the object of this disclosure to provide techniques for improving performance of beamforming in advanced communication schemes such as EHT (Extreme High Throughput) WiFi, for example according to IEEE 802.11be.

This object is achieved by the features of the independent claims. Further implementation forms are apparent from the dependent claims, the description and the figures.

A basic idea of this disclosure is to apply a new index definition for a new tone plan. The disclosure presents an update for parameters and formats defined by HE (High Efficiency) WiFi, e.g. according to IEEE 802.11ax, to include new and extended cases introduced by EHT WiFi, e.g. according to IEEE 802.11be.

The disclosure provides a new/extended definition for the following fields and parameters:

New sounding indices definition for BW≥80 MHz;

Extended definition of compressed precoder matrix values;

Extended definition of SNR values.

In particular, the disclosure introduces a mechanism for adjusting tone indices to 802.11be tone plan.

A new tone plan introduced by 802.11be is for partial BW transmission (including punctured BW) while the full 80 MHz BW assigned to a single STA (Station) (or group of STAs) will reuse 802.11ax tone plan. This new tone plan can be defined in a partial BW info field.

The disclosure introduces the following three optional solutions that will be described in detail hereinafter:

Option 1: Introduce a new unified sounding indices set to be used for all the options (means that the new set should cover both a new tone plan and 802.11ax tone plan of full BW);

Option 2: Introduce a new sounding indices set for partial BW sounding (by duplication of indices of 20 MHz portion) and add a center tones indices for full BW sounding;

Option 3: Reuse 802.11ax sounding indices set but define which sounding RUs correspond data RU defined by new tone plan.

A further idea of the disclosure is to define compressed beamforming matrix values and part of general parameters.

In summary, the disclosure defines indices for measurement and reported compressed beamforming precoder matrices for new bandwidth values and a new tone plan introduced by IEEE 802.11be standard. The disclosure also provides an exact definition of compressed precoder matrix form for MIMO schemes larger than 8×8 adopted by IEEE 802.11be.

In order to describe the invention in detail, the following terms, abbreviations and notations will be used:

BW bandwidth
MIMO Multiple-Input Multiple-Output
SNR signal-to-noise ratio
MU multi-user
SU single-user
Ng number of tones, tone grouping factor
Nc number of spatial streams
Na number of angles
Nr number of transmit antennas
RU resource unit
OFDMA Orthogonal Frequency Division Multiple Access
STA Station according to WiFi notation
AP Access point according to WiFi notation
S1 to S4 frequency segments
NDP Null Data Packet
Resource Unit (RU) is a unit in OFDMA terminology used in WiFi schemes to denote a group of subcarriers (tones) used in both Downlink (DL) and Uplink (UL) transmissions. With OFDMA, different transmit powers may be applied to different RUs. There are maximum of 9 RUs for 20 MHz bandwidth, 18 in case of 40 MHz and more in case of 80 or 160 MHz bandwidth. The RUs enable an Access Point to allow multi-users to access it simultaneously and efficiently.

According to a first aspect, the disclosure relates to a beamformer device, configured to: transmit a request to a beamformee device, the request comprising a set of sounding tone indices, the set of sounding tone indices indicating tones for which a report of beamforming information is requested from the beamformee device, wherein the tones are defined according to a first WiFi scheme, wherein the set of sounding tone indices is based on a first tone plan defined by the first WiFi scheme for a partial channel bandwidth and on a second tone plan defined by a second WiFi scheme for a full channel bandwidth.

Such a beamformer device can improve performance of beamforming in advanced communication schemes such as EHT by operating on a novel set of sounding tone indices that is based on the first tone plan for partial channel bandwidth and on the second tone plan for full channel bandwidth.

The beamformer device (also called beamformer) sends a sounding packet and requests a beamformee device (also called beamformec) to measure a channel on the specific BW which can be an entire BW or part of the BW that sounding packet is transmitted on.

Afterwards, beamformee is requested to transmit a compressed beamforming report, which includes beamforming info for those tones that were requested by beamformer. But the transmission of this report may be on the entire BW or any part of the BW, not related to reported tones at all.

For example, beamformer transmit sounding packet on 80 MHz and asks to report on first 10 MHz only, but the report will be transmitted using entire 80 MHz BW.

In this disclosure, a definition of set of tone indices is given to indicate which part of sounding BF is requested to be reported.

Regarding tone plans and WiFi schemes:

a. There are two Wifi schemes: 11be (named first scheme) which supports BW of 80/160/240/320 MHz and 11ax (named second scheme) that only 80 MHZ is relevant b. For any subset of 80 MHz BW, 11be WiFi scheme defined a new tone plan (named first tone plan)

c. For full 80 MHz BW 11be reuse 11ax tone plan (named second tone plan)

d. Any BW >80 MHz supported by 11be will use a duplication of 80 MHz tone plan which means that within any 80 MHz segment rules b. and c. are valid The first tone plan is partitioned into a plurality of resource units, RU, each RU allocating a respective portion of the channel bandwidth, wherein each RU is partitioned into a plurality of tones to be reported.

The set of sounding tone indices comprises for each RU a start sounding tone index defining a starting tone of the respective RU for reporting the beamforming information and an end sounding tone index defining an end tone of the respective RU for reporting the beamforming information.

In an exemplary implementation of the beamformer device, the first WiFi scheme is 802.11be WiFi, and the second WiFi scheme is 802.11ax WiFi.

This provides the advantage that the beamformer device can be applied with IEEE 802.11be WiFi schemes, which provide higher bandwidth and higher MIMO sizes than current versions of WiFi in order to improve performance.

In an exemplary implementation of the beamformer device, the first WiFi scheme is supporting channel bandwidths of 80 MHZ, 160 MHz, 80+80 MHz, 240 MHz and 320 MHz.

This provides the advantage that the beamformer device supports such bandwidths as currently supported by EHT WiFi.

In an exemplary implementation of the beamformer device, the second WiFi scheme is supporting a channel bandwidth of 80 MHZ.

This provides the advantage that the beamformer device is compliant with current version of IEEE 802.11ax WiFi supporting channel bandwidth of 80 MHZ.

In an exemplary implementation of the beamformer device, the full channel bandwidth is 80 MHz; and the partial channel bandwidth is any subset of the full channel bandwidth.

This provides the advantage that the beamformer device can be applied on a variety of different bandwidths, either based on the full channel bandwidth or on subsets thereof.

In an exemplary implementation of the beamformer device, the sounding tone indices are based on a new unified sounding index set that comprises sounding tone indices for both, the first tone plan for the partial channel bandwidth and the second tone plan for the full channel bandwidth.

This provides the advantage that the beamformer device can provide new sounding tone indices for bandwidths greater than 80 MHz.

Such a beamformer device supports a solution according to Option 1 as mentioned above. Corresponding tables are described below with respect to FIGS. 5, 6 and 7.

This implementation describes the rules for option 1 which are that the sounding tone indices are based on a new unified sounding index set that comprises sounding tone indices for both, the first tone plan for the partial channel bandwidth and the second tone plan for the full channel bandwidth. Further explanation of the rules is given in the Figures part of the description with respect to FIGS. 5 to 7 where the different tables with sounding tone indices are shown for this option 1.

In an exemplary implementation of the beamformer device, the sounding tone indices are based on a new sounding index set for the partial channel bandwidth and additional center tones indices for the full channel bandwidth.

This provides the advantage that the beamformer device can provide new sounding tone indices for a variety of bandwidths, in particular bandwidths greater than 80 MHz.

Such a beamformer device supports a solution according to Option 2 as mentioned above. Corresponding tables are described below with respect to FIGS. 8, 9 and 10.

This implementation describes the rules for option 2, which are that the sounding tone indices are based on a new sounding index set for the partial channel bandwidth and additional center tones indices for the full channel bandwidth. Further explanation of the rules is given in the Figures part of the description with respect to FIGS. 8 to 10 where the different tables with sounding tone indices are shown for this option 2.

In an exemplary implementation of the beamformer device, the sounding tone indices are based on a reuse of the sounding tone indices defined for resource units of the second tone plan and a definition which resource units of the second tone plan correspond to resource units of the first tone plan.

This provides the advantage that the beamformer device can efficiently reuse existing sounding tone indices for processing a variety of bandwidths, in particular bandwidths greater than 80 MHZ.

Such a beamformer device supports a solution according to Option 3 as mentioned above. Corresponding tables are described below with respect to FIGS. 11 and 12.

This implementation describes the rules for option 3, which are that the sounding tone indices are based on a reuse of the sounding tone indices defined for resource units of the second tone plan and a definition which resource units of the second tone plan correspond to resource units of the first tone plan. Further explanation of the rules is given in the Figures part of the description with respect to FIGS. 11 and 12 where the different tables with sounding tone indices are shown for this option 3.

In an exemplary implementation of the beamformer device, the set of sounding tone indices for a channel bandwidth greater than the full channel bandwidth, in particular for a channel bandwidth of 160 MHz, 80+80 MHz, 240 MHz or 320 MHz, is based on a duplication of rules defined for the set of sounding tone indices within each segment of the full channel This provides the advantage that the beamformer device can be applied with WiFi schemes of high bandwidth, in particular bandwidths greater than 80 MHZ.

FIG. 11 described below shows indices definition for bandwidth greater than 80 MHZ.

Duplication of rules means that rules defined for a specific bandwidth section are also valid for another bandwidth section. For example, rules defined for a bandwidth of 80 MHz can also be applied to the bandwidth section between 80 MHz and 100 MHZ.

In an exemplary implementation of the beamformer device, the request to the beamformee device indicates a channel bandwidth, wherein the indicated channel bandwidth is a full channel bandwidth defined for the first WiFi scheme.

This provides the advantage that the beamformer device is informed of the channel bandwidth used by the beamformer device in order to efficiently report its beamforming parameters.

In an exemplary implementation of the beamformer device, the indicated channel bandwidth is a full channel bandwidth of 80 MHz, 80+80 MHZ, 160 MHz, 240 MHz, 320 MHz or any partial bandwidth thereof.

This provides the advantage that the beamformer device can be applied with a variety of different bandwidths.

The first WiFi scheme, e.g. 812.11be, defines a plurality of full channel bandwidths, e.g. 80 MHz, 80+80 MHz, 160 MHz, 240 MHz, 320 MHz. This full channel bandwidth or a partial channel bandwidth of this full channel bandwidth is indicated by the beamformer device. A partial bandwidth is any portion of the full bandwidth, e.g. a partial bandwidth of 80 MHZ full bandwidth may be 20 MHz or 40 MHz or 60 MHz or 77 MHz or any other portion of 80 MHz. For example, a partial bandwidth of 320 MHz full bandwidth may be any portion of 320 MHz, e.g. 80 MHz or 160 MHz or 200 MHz or 300 MHz or 319 MHz, or any other portion of 320 MHZ.

In an exemplary implementation of the beamformer device, the set of sounding tone indices is defined per channel bandwidth and per number of tones, Ng, in particular for Ng=4 and Ng=16.

This provides the advantage that the beamformer device is flexible with respect to the channel bandwidth and the number of tones.

According to a second aspect, the disclosure relates to a method for requesting beamforming information, the method comprising: transmitting, by a beamformer device, a request to a beamformee device, the request comprising a set of sounding tone indices, the set of sounding tone indices indicating tones for which a report of beamforming information is requested from the beamformee device, wherein the tones are defined according to a first WiFi scheme, wherein the set of sounding tone indices is based on a first tone plan defined by the first WiFi scheme for a partial channel bandwidth and on a second tone plan defined by a second WiFi scheme for a full channel bandwidth; and receiving the report of beamforming information from the beamformee device based on the set of sounding tone indices.

This method corresponds to the beamformer device described above for the first aspect of the disclosure.

Such a method for requesting beamforming information can improve performance of beamforming in advanced communication schemes such as EHT by operating on a novel set of sounding tone indices that is based on the first tone plan for partial channel bandwidth and on the second tone plan for full channel bandwidth.

The first WiFi scheme may be 802.11be WiFi, particularly supporting channel bandwidths of 80 MHZ, 160 MHZ, 80+80 MHz, 240 MHz and 320 MHz. the second WiFi scheme may be 802.11ax WiFi, particularly supporting a channel bandwidth of 80 MHZ.

According to a third aspect, the disclosure relates to a beamformee device, configured to: transmit a report of beamforming information to a beamformer device based on a set of sounding tone indices received from the beamformer device, wherein the set of sounding tone indices are indicating tones for which a report of beamforming information is requested from the beamformee device, wherein the tones are defined according to a first WiFi scheme, wherein the set of sounding tone indices is based on a first tone plan defined by the first WiFi scheme for a partial channel bandwidth and on a second tone plan defined by a second WiFi scheme for a full channel bandwidth.

Such a beamformee device can improve performance of beamforming in advanced communication schemes such as EHT by operating on a novel set of sounding tone indices that is based on the first tone plan for partial channel bandwidth and on the second tone plan for full channel bandwidth.

This beamformee device has the same features as the beamformer device of the first aspect described above. But it is the entity that receives the request from the beamformer device and transmits the report to beamformer device.

The first WiFi scheme may be 802.11be WiFi, particularly supporting channel bandwidths of 80 MHz, 160 MHZ, 80+80 MHz, 240 MHz and 320 MHz. The second WiFi scheme may be 802.11ax WiFi, particularly supporting a channel bandwidth of 80 MHZ.

According to a fourth aspect, the disclosure relates to a method for reporting beamforming information, the method comprising: transmitting, by a beamformee device, a report of beamforming information to a beamformer device based on a set of sounding tone indices received from the beamformer device, wherein the set of sounding tone indices are indicating tones for which a report of beamforming information is requested from the beamformee device, wherein the tones are defined according to a first WiFi scheme, wherein the set of sounding tone indices is based on a first tone plan defined by the first WiFi scheme for a partial channel bandwidth and on a second tone plan defined by a second WiFi scheme for a full channel bandwidth.

Such a method for reporting beamforming information can improve performance of beamforming in advanced communication schemes such as EHT by operating on a novel set of sounding tone indices that is based on the first tone plan for partial channel bandwidth and on the second tone plan for full channel bandwidth.

This method corresponds to the beamformee device described above for the third aspect of the disclosure.

The first WiFi scheme may be 802.11be WiFi, particularly supporting channel bandwidths of 80 MHZ, 160 MH2, 80+80 MHz, 240 MHz and 320 MHz. The second WiFi scheme may be 802.11ax WiFi, particularly supporting a channel bandwidth of 80 MHZ.

According to a fifth aspect, the disclosure relates to a beamformer device, configured to: receive a beamforming report from a beamformee device, wherein the beamforming report comprises a compressed precoder matrix; and reconstruct a precoder matrix reported by the beamformee device based on the compressed precoder matrix, wherein the compressed precoder matrix is defined by a set of angles in a specific order that implies a sequence of mathematical operations to be applied on a unit matrix to reconstruct the precoder matrix, wherein the set of angles is determined based on an extension of a given formula specified for a number of transmit antennas and a number of spatial streams supported by a second WiFi scheme, in particular 802.11ax WiFi, to a number of transmit antennas, Nr, and a number of spatial streams, Nc, supported by a first WiFi scheme, in particular 802.11be WiFi.

Such a beamformer device can improve performance of beamforming in advanced communication schemes such as EHT by using the extended formula which is extended with respect to number of transmit antennas and number of spatial streams as supported by EHT.

In an exemplary implementation of the beamformer device, the extension of the given formula is specified for values of $8<Nr\leq16$ and values of $1\leq Nc\leq16$ corresponding to matrices from $9\times1$ to $16\times16$.

This provides the advantage that higher MIMO sizes can be implemented and optimally controlled. I.c. the beamformer device can be applied in denser populated environments having higher number of stations.

In an exemplary implementation of the beamformer device, the beamforming report comprises SNR values of spatial streams reported by the beamformee device, wherein each reported i-th SNR value, in particular for $i>8$, corresponds to an SNR that results from applying an i-th column of the reported precoder matrix by the beamformer device.

This provides the advantage that SNR values can be better controlled.

In an exemplary implementation of the beamformer device, the beamforming report comprises SNR values of spatial streams for MIMO schemes larger than $8\times8$.

This provides the advantage that the beamformer device can be applied with spatial streams of high MIMO size and hence improve communication quality.

According to a seventh aspect, the disclosure relates to a computer program product including computer executable code or computer executable instructions that, when executed, causes at least one computer to execute the method according to the aspects above. Such a computer program product may include a non-transient readable storage medium storing program code thereon for use by a processor, the program code comprising instructions for performing the methods or the computing blocks as described hereinafter.

According to an eighth aspect, the disclosure relates to a beamformer device (110), configured to transmit a request of partial bandwidth, BW, for sounding feedback to a beamformee device (120), the requested partial BW for sounding feedback comprising a partial BW type, indicating the BW to be used for sounding feedback.

In an exemplary implementation of the beamformer device according to the eighth aspect the partial BW type can be 20 MHz, 40 MHz or $n\times80$ MHz, wherein n is an integer equal or larger than 1.

In an exemplary implementation of the beamformer device according to the eighth aspect the requested partial BW for sounding feedback is comprised in a Partial BW Info field.

In an exemplary implementation of the beamformer device according to the eighth aspect the Partial BW Info Field comprises 6 bits.

In an exemplary implementation of the beamformer device according to the eighth aspect the 2 least significant bits of the Partial BW Info Field indicate the type of partial BW.

In the following we show an exemplary mapping between the two least significant bits B0, B1 of the Partial BW Info Field and the requested partial BW. Any other mapping is also possible.

| B0 | B1 | Requested partial BW | Resource Units |
|----|----|---------------------|----------------|
| 0 | 0 | 20 MHz | RU242 |
| 0 | 1 | 40 MHz | RU484 |
| 1 | 0 | n x 80 MHz (80/160/240/320 MHz) | |
| 1 | 1 | Reserved | Reserved |

In an exemplary implementation of the beamformer device according to the eighth aspect the 4 most significant bits of the Partial BW Info Field indicate a specific BW corresponding the indicated partial BW type.

In the following we show an exemplary mapping between the four most significant bits B2, B3, B4 and B5 of the Partial BW Info Field and the location of the resource units. Any other mapping is also possible.

| B2 | B3 | B4 | B5 | Location of the Resource Units |
|----|----|----|----|-------------------------------|
| 0 | 0 | 0 | 0 | RU located at the lowest frequency |
| X | X | X | X | Reserved |
| 1 | 1 | 1 | 1 | RU located at the highest frequency |

In an exemplary implementation of the beamformer device according to the eighth aspect if a partial BW type of 20 MHz is signaled, the 4 most significant bits of the Partial BW Info Field of the Partial BW Info Field indicate k-th RU242, where k is an integer equal or larger than 0. In particular, k may be an integer from 0 to 15.

In an exemplary implementation of the beamformer device according to the eighth aspect if a partial BW type of 40 MHz is signaled, the 4 most significant bits of the Partial BW Info Field indicate k-th RU484, where k is an integer equal or larger than 0, in particular from 0 to 7, or k-th RU242, where k is an integer equal or larger than 0. In particular, k may be an integer from 0 to 15.

In an exemplary implementation of the beamformer device according to the eighth aspect if a partial BW type of $n\times80$ MHz is signaled, the 4 most significant bits of the Partial BW Info Field indicate a bitmap for 4 segments of 80 MHz, wherein an indicated '1' means 80 MHz is requested for sounding feedback.

In an exemplary implementation of the beamformer device according to the eighth aspect if a partial BW type of 20 MHz is signaled, for indicated k-th RU242, tone indices defined for k RU242 are used, wherein k is an integer equal or larger than 0.

In an exemplary implementation of the beamformer device according to the eighth aspect if a partial BW type of 40 MHz is signaled, for indicated k-th RU484, tone indices defined for $2\times k$ and $2\times k+1$ RU242 are used and for indicated k-th RU242, tone indices defined for k and k+1 RU242 are used, wherein k is an integer equal or larger than 0.

In an exemplary implementation of the beamformer device according to the eighth aspect if a partial BW type of n×80 MHz is signaled, tone indices defined for 4*k, 4*k+1, 4*k+2, 4*k+3 RU242 are used, wherein n and k are integer equal or larger than 0.

BRIEF DESCRIPTION OF THE DRAWINGS

Further embodiments of the invention will be described with respect to the following figures, in which:

FIG. 1 shows a schematic diagram 100 illustrating a sounding procedure 100 defined for transmission of beamforming information between beamformer 110 and beamformee 120;

FIG. 3 shows a resource unit index table 300 with start and end indices definition for Sounding in IEEE 802.11ax standard;

FIG. 4 shows a tone plan 400 defined by IEEE 802.11be standard for 80 MHZ;

FIG. 10 shows a superset of subcarrier indices 1000 for partial bandwidth compressed beamforming of 80 MHz bandwidth according to the second optional solution of the disclosure;

FIG. 12 shows an indices definition table 1200 for bandwidths greater than 80 MHZ according to the third optional solution of the disclosure;

FIG. 13 shows an exemplary angles definition table, T9, 1300 illustrating the order of angles in the compressed beamforming feedback matrix subfield for a number of transmit antennas Nr=9 according to the disclosure;

FIG. 14 shows an exemplary angles definition table, T10, 1400 illustrating the order of angles in the compressed beamforming feedback matrix subfield for a number of transmit antennas Nr=10 according to the disclosure;

FIGS. 15 and 16 show an exemplary angles definition table, T11a, T11b illustrating the order of angles in the compressed beamforming feedback matrix subfield for a number of transmit antennas Nr=11 according to the disclosure, the first part T11a, 1500 of the table is shown in FIG. 15 and the second part T11b, 1600 of the table is shown in FIG. 16;

FIGS. 17 and 18 show an exemplary angles definition table, T12a, T12b illustrating the order of angles in the compressed beamforming feedback matrix subfield for a number of transmit antennas Nr=12 according to the disclosure, the first part T12a, 1700 of the table is shown in FIG. 17 and the second part T12b, 1800 of the table is shown in FIG. 18;

FIGS. 19 and 20 show an exemplary angles definition table, T13a, T13b illustrating the order of angles in the compressed beamforming feedback matrix subfield for a number of transmit antennas Nr=13 according to the disclosure, the first part T13a, 1900 of the table is shown in FIG. 19 and the second part T13b, 2000 of the table is shown in FIG. 20;

FIGS. 21 and 22 show an exemplary angles definition table, T14a, T14b illustrating the order of angles in the compressed beamforming feedback matrix subfield for a number of transmit antennas Nr=14 according to the disclosure, the first part T14a, 2100 of the table is shown in FIG. 21 and the second part T14b, 2200 of the table is shown in FIG. 22;

FIGS. 23 and 24 show an exemplary angles definition table, T15a, T15b illustrating the order of angles in the compressed beamforming feedback matrix subfield for a number of transmit antennas Nr=15 according to the disclosure, the first part T15a, 2300 of the table is shown in FIG. 23 and the second part T15b, 2400 of the table is shown in FIG. 24;

FIGS. 25, 26 and 27 show an exemplary angles definition table, T16a, T16b, T16c illustrating the order of angles in the compressed beamforming feedback matrix subfield for a number of transmit antennas Nr=16 according to the disclosure, the first part T16a, 2500 of the table is shown in FIG. 25, the second part T16b, 2600 of the table is shown in FIG. 26 and the third part T16c, 2700 of the table is shown in FIG. 27;

FIG. 31 shows a schematic diagram of a modified STA Info Subfield.

DETAILED DESCRIPTION OF EMBODIMENTS

Figure 2:
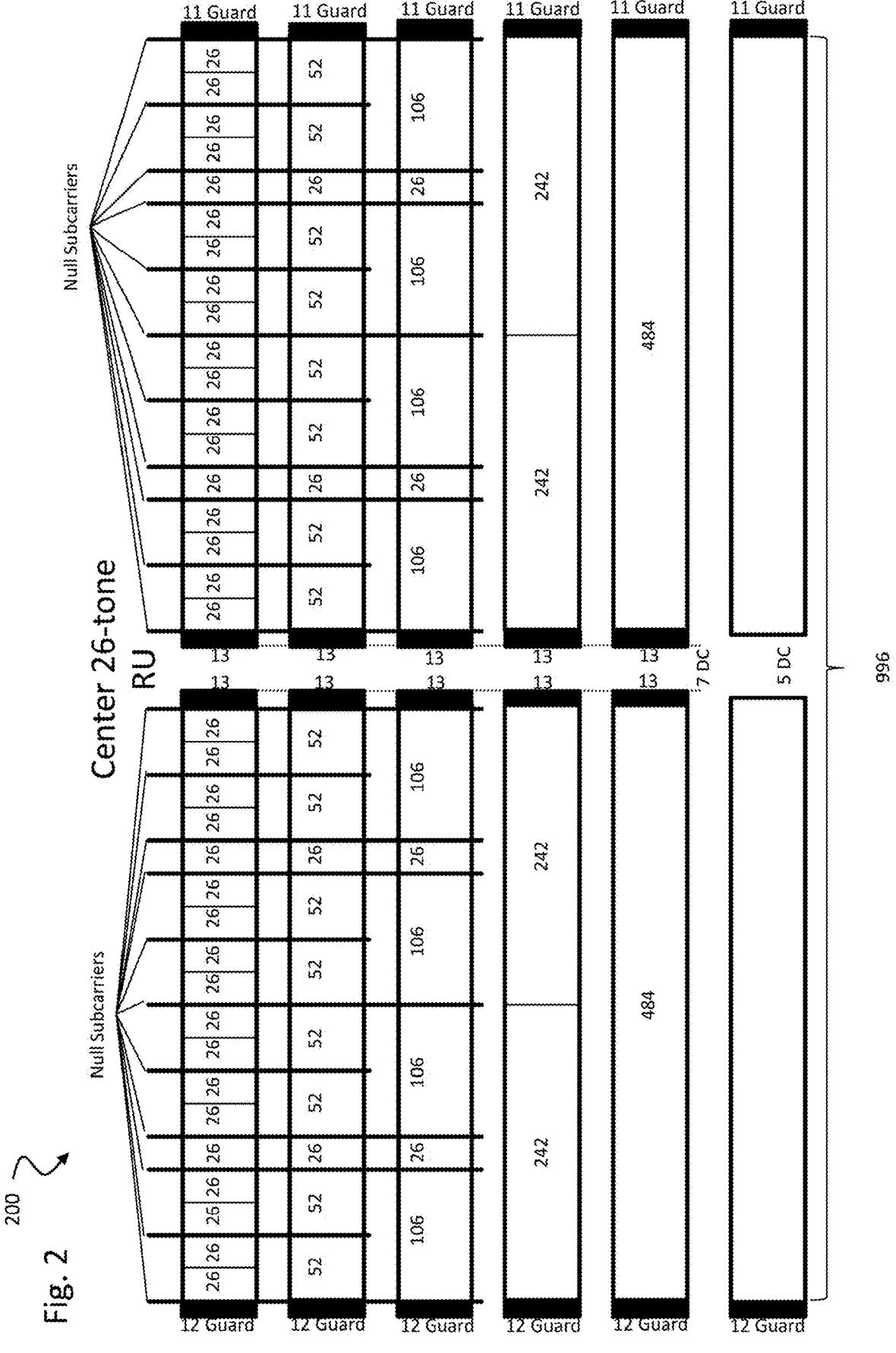
FIG. 2 shows a tone plan 200 defined by IEEE 802.11ax standard with resource unit locations of 80 MHZ.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices and systems described herein may be implemented in wireless communication schemes, in particular communication schemes according to WiFi communication standards according to IEEE 802.11, in particular 802.11n/ac/ax versions of the WiFi standard and 802.11be version of the WiFi standard. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender). However, devices described herein are not limited to transmit and/or receive radio signals, also other signals designed for transmission in deterministic communication networks may be transmitted and/or received.

The devices and systems described herein may include processors or processing devices, memories and transceivers, i.e. transmitters and/or receivers. The term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications etc.

FIG. 1 shows a schematic diagram 100 illustrating a sounding procedure 100 defined for transmission of beamforming information between beamformer 110 and beamformee 120.

Beamforming depends on channel calibration procedures, called channel sounding in the 802.11 WiFi standard, to determine how to radiate energy in a preferred direction.

Channel sounding 100 consists of three major steps:

In a first step, the beamformer 110 begins the process by transmitting a Null Data Packet (NDP) Announcement frame 111, which is used to gain control of the channel and identify beamformees. Beamformees 120 will respond to the NDP Announcement 111, while all other stations will simply defer channel access until the sounding sequence is complete.

In a second step, the beamformer 110 follows the NDP Announcement 111 with a null data packet (NDP) 112. The value of an NDP 112 is that the receiver can analyze the OFDM training fields to calculate the channel response, and therefore the steering matrix. For multi-user transmissions, multiple NDPs 112 may be transmitted.

In a third step, the beamformee 120 analyzes the training fields in the received NDP 112 and calculates a feedback matrix. The feedback matrix which is reported by the beamformee 120 in compressed beamforming report 121 enables the beamformer 110 to calculate the steering matrix to direct transmissions toward the beamformee 120.

The sounding procedure 100 may be performed on the entire bandwidth or part of the BW. A specific set of tone (subcarrier) indices is defined for sounding of every portion of the supported bandwidth. IEEE 802.11be WiFi introduces a larger bandwidth and larger MIMO size which require updated feedback parameters, frame format and also an exact definition of compressed precoder matrix and SNR.

Moreover, 802.11be introduces a new tone plan which implies different tone definition to be applied for sounding as well.

In the following, a beamformer device 110 and a beamformee device 120 are described which improve performance of beamforming in advanced communication schemes such as EHT WiFi, for example according to IEEE 802.11bc.

Figure 4:
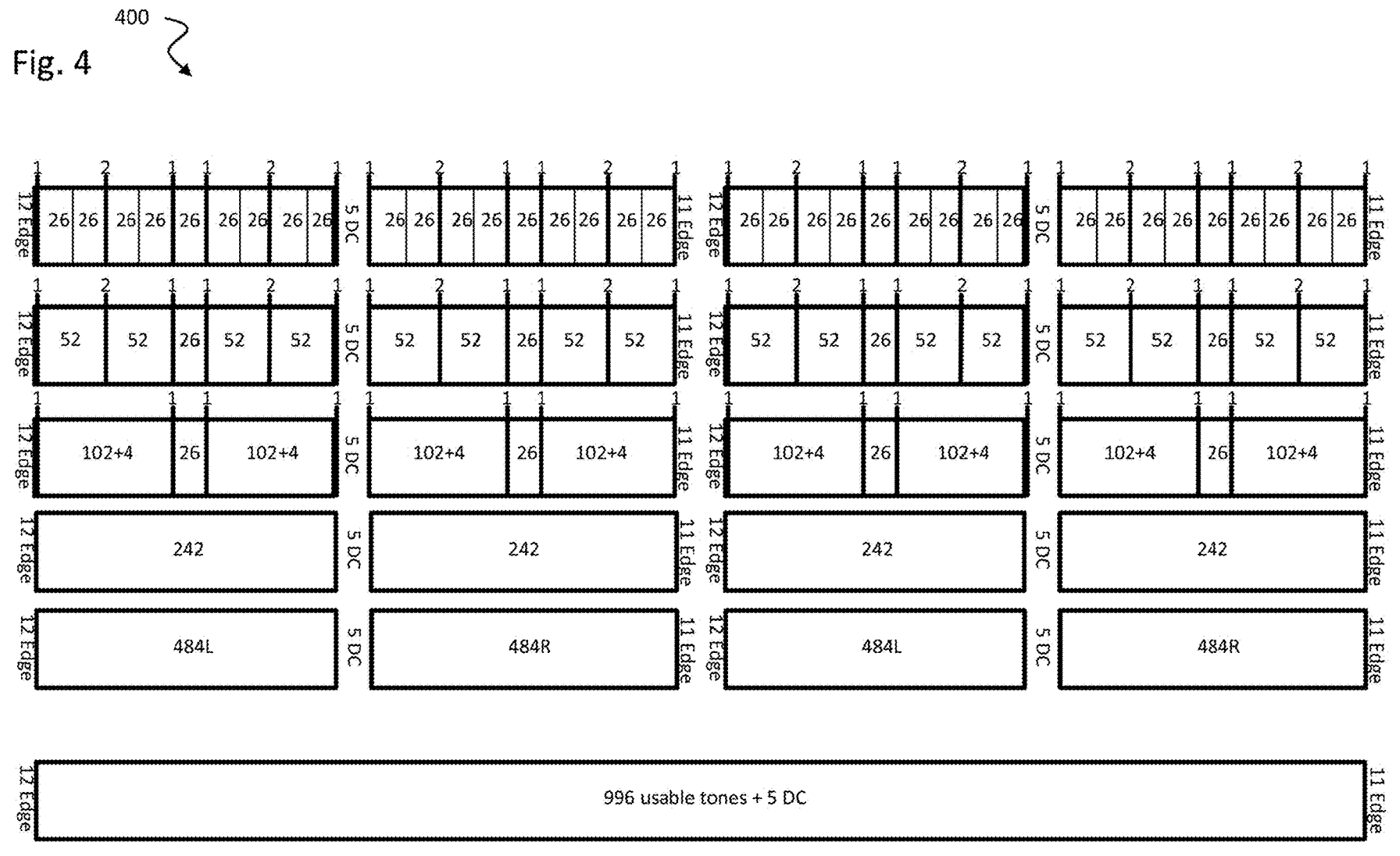

Such a novel beamformer device 110 is configured to transmit a request 111 (e.g. by NDP Announcement) to a beamformee device 120. The request comprises a set of sounding tone indices indicating tones for which a report 121 of beamforming information is requested from the beamformee device 120. The tones are defined according to a first WiFi scheme. The set of sounding tone indices is based on a first tone plan (e.g. a first tone plan 400 as shown in FIG. 4) defined by the first WiFi scheme for a partial channel bandwidth and on a second tone plan (e.g. a second tone plan 200 as shown in FIG. 2) defined by a second WiFi scheme for a full channel bandwidth.

The first WiFi scheme may be 802.11be WiFi, and the second WiFi scheme may be 802.11ax WiFi.

The first WiFi scheme may support channel bandwidths of 80 MHz, 160 MHZ, 80+80 MHz, 240 MHz and 320 MHZ.

The second WiFi scheme may support a channel bandwidth of 80 MHZ.

The full channel bandwidth may be 80 MHz, for example. The partial channel bandwidth may be any subset of the full channel bandwidth, for example.

According to the first optional solution described above, the sounding tone indices may be based on a new unified sounding index set, e.g. a set 500, 600, 700 as described below with respect to FIGS. 5, 6 and 7, that comprises sounding tone indices for both, the first tone plan 400 for the partial channel bandwidth and the second tone plan 200 for the full channel bandwidth.

According to the second optional solution described above, the sounding tone indices may be based on a new sounding index set, e.g. a set 800, 900, 1000 as described below with respect to FIGS. 8, 9 and 10, for the partial channel bandwidth and additional center tones indices for the full channel bandwidth.

According to the third optional solution described above, the sounding tone indices may be based on a reuse of the sounding tone indices, e.g. the sounding tone indices 1100, 1200 described below with respect to FIGS. 11 and 12, defined for resource units of the second tone plan 200 and a definition which resource units of the second tone plan 200 correspond to resource units of the first tone plan 400.

The set of sounding tone indices for a channel bandwidth greater than the full channel bandwidth, for example for a channel bandwidth of 160 MHz, 80+80 MHZ, 240 MHZ or 320 MHz, may be based on a duplication of rules defined for the set of sounding tone indices within each segment of the full channel bandwidth, e.g. as described below with respect to FIGS. 11 and 12.

The request to the beamformee device 120 may indicate a channel bandwidth. The indicated channel bandwidth may be a full channel bandwidth defined for the first WiFi scheme.

For example, the indicated channel bandwidth may be a full channel bandwidth of 80 MHz, 80+80 MHZ, 160 MHz, 240 MHz, 320 MHz or any partial bandwidth thereof.

The set of sounding tone indices may be defined per channel bandwidth and per number of tones, Ng, for example for Ng=4 and Ng=16.

Such a novel beamformee device 120 shown in FIG. 1 is configured to transmit a report 121 of beamforming information to a beamformer device 110 based on a set of sounding tone indices received from the beamformer device 110. The set of sounding tone indices are indicating tones for which a report of beamforming information is requested from the beamformee device 120. The tones are defined according to a first WiFi scheme. The set of sounding tone indices is based on a first tone plan defined by the first WiFi scheme for a partial channel bandwidth and on a second tone plan defined by a second WiFi scheme for a full channel bandwidth.

As described above, a further idea of the disclosure is to define compressed beamforming matrix values and part of general parameters.

This can be implemented by a novel beamformer device 110, configured to: receive a beamforming report 121 from a beamformee device 120, wherein the beamforming report 121 comprises a compressed precoder matrix; and reconstruct a precoder matrix reported by the beamformee device 120 based on the compressed precoder matrix. The compressed precoder matrix is defined by a set of angles in a specific order that implies a sequence of mathematical operations to be applied on a unit matrix to reconstruct the precoder matrix. The set of angles is determined based on an extension of a given formula specified for a number of transmit antennas and a number of spatial streams supported by a second WiFi scheme, for example 802.11ax WiFi, to a number of transmit antennas, Nr, and a number of spatial streams, Nc, supported by a first WiFi scheme, for example 802.11be WiFi.

The specific formula may be given in section 20.3.12.3.6 of 802.11 n standard and defined by each version of 802.11 with respect to allowed Nr and Nc values.

Specific values for the set of angles are given in tables T9, T10, T11a/b, T12a/b, T13a/b, T14a/b, T15a/b and T16a/b/c for different numbers of transmit antennas, Nr, as shown in FIGS. 13 to 27.

The extension of the given formula may be specified for values of $8 < Nr \leq 16$ and values of $1 \leq Nc \leq 16$ corresponding to matrices from 9×1 to 16×16.

The beamforming report 121 may comprise SNR values of spatial streams reported by the beamformee device 120. Each reported i-th SNR value, in particular for i>8, corresponds to an SNR that results from applying an i-th column of the reported precoder matrix by the beamformer device 120.

The beamforming report 121 may comprise SNR values of spatial streams for MIMO schemes larger than 8×8.

FIG. 2 shows a tone plan 200 defined by IEEE 802.11ax standard with resource unit locations of 80 MHz, also denoted hereinafter as second tone plan.

802.11ax standard introduced OFDMA format where the entire bandwidth is divided into blocks defined as Resource Units (RUs). Transmitted signal may be combined of multiple allocations where different RUs allocated for different stations. The RU sizes are defined by number of frequency tones and can be of 26/52/106/242/484/996 tones as shown in FIG. 2. The bandwidth of 80 MHz includes 9 RUs of 26, 4 RUs of 52 and so on as depicted in FIG. 2.

FIG. 3 shows a resource unit index table 300 with start (S) and end (E) indices definition for Sounding in IEEE 802.11ax standard.

Sounding procedure (as shown in FIG. 1) defines sampling of frequency for channel measurement and report that can be every 4 or 16 (Ng) tones. In order to align between RUs definition and sounding sampling parameter, an explicit definition of set of tone indices is provided by standard for sounding procedure.

For each RU a start sounding tone index, i.e. RU Index Start, (denoted by S in FIG. 3) and end sounding tone index, i.e. RU Index End, (denoted by E in FIG. 3) is defined to ensure all the tones of RUs are covered. Sounding start/end indices are different from regular tone indices used for data transmission, see example in FIG. 3. The set of indices is defined per bandwidth (in FIG. 3 shown for bandwidths of 20 MHz, 40 MHz, 80 MHz, 160 MHZ, and 80+80 MHZ) and per Ng value FIG. 4 shows a tone plan 400 defined by IEEE 802.11be standard for 80 MHZ, also denoted hereinafter as first tone plan.

The IEEE 802.11be standard introduces the three main changes in terms of bandwidth over 802.11ax: A larger BW is supported of 240 MHz and 320 MHz. A new tone plan 400 as illustrated in FIG. 4 is defined for 80 MHz bandwidth for all the cases except the case when full bandwidth is allocated to a single station (STA) (or a group of STAs). All the bandwidths greater than 80 MHz are defined as a duplication of 80 MHz bandwidth.

Indices defined by sounding procedure of 802.11ax (see FIG. 1) are no longer aligned to locations of RUs as given by the new tone plan 400. Thus, sounding procedure definitions need to be updated to follow the new tone plan 400 and also a new rule of duplication of the tone plan 400 for bandwidth.

Figure 5:
FIG. 5 shows a resource unit index table 500 with RU start and end indices definition for Unified Indices Set of Ng=4 and 80 MHz bandwidth according to the first optional solution of the disclosure.
Figure 6:
FIG. 6 shows a resource unit index table 600 with RU start and end indices definition for Unified Indices Set of Ng=16 and 80 MHz bandwidth according to the first optional solution of the disclosure.
Figure 7:
FIG. 7 shows a superset of subcarrier indices 700 for compressed beamforming of 80 MHz bandwidth according to the first optional solution of the disclosure.

FIGS. 5, 6 and 7 describe the solution according to option 1 for the new index definition for the new tone plan. Option 1 introduces a new unified sounding indices set to be used for all the options, that means that the new set covers both a new tone plan and 802.11ax tone plan of full BW.

FIG. 5 shows a resource unit index table 500 with RU start and end indices definition for Unified Indices Set of Ng=4 and 80 MHz bandwidth. FIG. 6 shows a resource unit index table 600 with RU start and end indices definition for Unified Indices Set of Ng=16 and 80 MHz bandwidth. FIG. 7 shows a corresponding superset of subcarrier indices 700 for compressed beamforming of 80 MHz bandwidth.

The unified indices set is a new set introduced for entire 80 MHz bandwidth while all the RUs of 26 tones are covered by single RU Start/End index pair and in addition center tones of 996 RU are covered as additional tones.

The rules for applying this option 1 are as follows:

RU Start/End Index corresponds to 26RUs defined by new tone plan of 80 MHZ bandwidth (see FIG. 4);

For Ng=4, if indicated RUs cover entire bandwidth, indices of center portion are used as well.

The indices for Ng=4 and Ng=16 are shown in FIGS. 5 and 6, respectively.

And the superset of indices for 80 MHz is shown in FIG. 7.

Figure 8:
FIG. 8 shows a resource unit index table 800 with RU start and end indices definition for Partial bandwidth of Ng=4 and 80 MHz bandwidth according to the second optional solution of the disclosure.
Figure 9:
FIG. 9 shows a resource unit index table 900 with RU start and end indices definition for Partial bandwidth of Ng=16 and 80 MHz bandwidth according to the second optional solution of the disclosure.

FIGS. 8, 9 and 10 describe the solution according to option 2 for the new index definition for the new tone plan. Option 2 introduces a new sounding indices set for partial bandwidth sounding, by duplication of indices of 20 MHz portion, and adding center tones indices for full BW sounding.

FIG. 8 shows a resource unit index table 800 with RU start and end indices definition for Partial bandwidth of Ng=4 and 80 MHz bandwidth. FIG. 9 shows a resource unit index table 900 with RU start and end indices definition for Partial bandwidth of Ng=16 and 80 MHZ bandwidth. FIG. 10 shows a corresponding superset of subcarrier indices 1000 for partial bandwidth compressed beamforming of 80 MHz bandwidth.

In this Option 2, a set of indices for partial BW sounding is defined. The indices are defined as a duplication of 20 MHz portions. The rules for applying this options are as follows:

RU Start/End Index corresponds to 26RUs defined by new tone plan of 80 MHZ BW (scc FIG. 4);

If indicated RUs cover entire bandwidth, use additional center portion indices.

The indices for Ng=4 and Ng=16 are shown in FIGS. 8 and 9, respectively.

And the superset of indices for partial bandwidth compressed beamforming 80 MHz is shown in FIG. 10.

Figure 11:
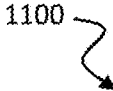
FIG. 11 shows a cross-reference table 1100 for resource unit indices of 80 MHZ bandwidth according to the third optional solution of the disclosure.

FIGS. 11 and 12 describe the solution according to option 3 for the new index definition for the new tone plan. Option 3 introduces reusing 802.11ax sounding indices set but defining which sounding RUs correspond data RU defined by new tone plan.

FIG. 11 shows a cross-reference table 1100 for resource unit indices of 80 MHZ bandwidth according to the third optional solution of the disclosure.

In this option 3, the definition of indices in 802.11ax standard is reused (see Tables 9-93c-d of IEEE 802.11ax). The corresponding indices for the new tone plan (see FIG. 4) are given in FIG. 11. This means that every 26RU indicated for sounding use indexes defined in 802.11ax using RUs indices as shown in FIG. 11.

FIG. 12 shows an indices definition table 1200 for bandwidths greater than 80 MHZ according to the third optional solution of the disclosure.

IEEE 802.11be defines that the tone plan for every bandwidth greater than 80 MHZ will be a duplication of 80 MHz. Every suggested option of new indices set is applicable for a bandwidth greater than 80 MHz as a duplication of indices for multiple 80 MHz segments, both for partial BW sounding and full BW sounding.

Thus, the indices for compressed beamforming of a bandwidth greater than 80 MHZ can be given as depicted in FIG. 12. S1 corresponds to lower frequency segment, S2-S4 correspond to frequency segments in ascending order.

As described above, a further idea of the disclosure is to define compressed beamforming matrix values and part of general parameters.

This can be implemented by a novel beamformer device 110 as described above with respect to FIG. 1. This novel beamformer device 110 is configured to receive a beamforming report 121 from a beamformee device 120. The beamforming report 121 comprises a compressed precoder matrix. The novel beamformer device 110 is configured to reconstruct a precoder matrix reported by the beamformee device 120 based on the compressed precoder matrix. The compressed precoder matrix is defined by a set of angles in a specific order that implies a sequence of mathematical operations to be applied on a unit matrix to reconstruct the precoder matrix. The set of angles is determined based on an extension of a given formula specified for a number of transmit antennas and a number of spatial streams supported by a second WiFi scheme, for example 802.11ax WiFi, to a number of transmit antennas, Nr, and a number of spatial streams, Nc, supported by a first WiFi scheme, for example 802.11be WiFi. The specific formula may be given in section 20.3.12.3.6 of 802.11n standard and defined by each version of 802.11 with respect to allowed Nr and Nc values.

Specific values for the set of angles are given in tables T9, T10, T11a/b, T12a/b, T13a/b, T14a/b, T15a/b and T16a/b/c for different numbers of transmit antennas, Nr, as shown in FIGS. 13 to 27.

The compressed precoder matrix is defined by a set of angles in a specific order that implies a sequence of mathematical operations that beamformer should apply on the unit matrix to reconstruct precoder matrix reported by beanformee. The angles are obtained by the formula given in section 20.3.12.3.6 of IEEE 802.11n standard and defined by each version of IEEE 802.11 with respect to allowed Nr and Nc values. The definition includes Na (number of angles) and also the exact order of angles for feedback report transmission. Thus, the disclosure extends this definition for schemes larger than 8×8 as defined in IEEE 802.11be. The full definition of all the angles for all the possible MIMO size is shown below with respect to FIGS. 13 to 27.

The beamforming report includes also SNR values for the reported spatial streams. In Single-User feedback format only average SNR (over entire bandwidth) is reported, while in Multi-User format, both average SNR and SNR per-tone are reported. The number of SNR values equal Nc while the i-th SNR value corresponds to expected SNR if beamformer applies a i-th column of the reported precoder matrix. This scheme can be extended for Nc>8 according to the following rule:

For any i>8, reported i-th SNR value (average and per-tone) corresponds to an expected SNR if beamformer applies a i-th column of the reported precoder matrix.

FIG. 13 shows an exemplary angles definition table, T9, 1300 illustrating the order of angles in the compressed beamforming feedback matrix subfield for a number of transmit antennas Nr=9.

The angles definition table, T9, 1300 defines the order of angles in the compressed beamforming feedback matrix subfield for a number of transmit antennas Nr=9 and for different numbers of Nc, i.e. spatial streams ranging from 1 to 9. The corresponding size of the feedback matrix V is also depicted in FIG. 13 for the chosen parameters Nr=9 and Nc=1 to 9. Furthermore, a number of angles, Na, ranging from 16 to 72, is given in table T9, 1300.

FIG. 14 shows an exemplary angles definition table, T10, 1400 illustrating the order of angles in the compressed beamforming feedback matrix subfield for a number of transmit antennas Nr=10.

The angles definition table, T10, 1400 defines the order of angles in the compressed beamforming feedback matrix subfield for a number of transmit antennas Nr=10 and for different numbers of Nc, i.e. spatial streams ranging from 1 to 10. The corresponding size of the feedback matrix V is also depicted in FIG. 14 for the chosen parameters Nr=10 and Nc=1 to 10. Furthermore, a number of angles, Na, ranging from 18 to 90, is given in table T10, 1400.

FIGS. 15 and 16 show an exemplary angles definition table, T11a, T11b illustrating the order of angles in the compressed beamforming feedback matrix subfield for a number of transmit antennas Nr=11, the first part T11a, 1500 of the table is shown in FIG. 15 and the second part T11b, 1600 of the table is shown in FIG. 16.

The angles definition table, T11a, T11b defines the order of angles in the compressed beamforming feedback matrix subfield for a number of transmit antennas Nr=11 and for different numbers of Nc, i.e. spatial streams ranging from 1 to 11. The corresponding size of the feedback matrix V is also depicted in FIGS. 15 and 16 for the chosen parameters Nr=11 and Nc=1 to 11. Furthermore, a number of angles, Na, ranging from 20 to 110, is given in table T11a, T11b.

FIGS. 17 and 18 show an exemplary angles definition table, T12a, T12b illustrating the order of angles in the compressed beamforming feedback matrix subfield for a number of transmit antennas Nr=12 according to the disclosure, the first part T12a, 1700 of the table is shown in FIG. 17 and the second part T12b, 1800 of the table is shown in FIG. 18.

The angles definition table, T12a, T12b defines the order of angles in the compressed beamforming feedback matrix subfield for a number of transmit antennas Nr=12 and for different numbers of Nc, i.e. spatial streams ranging from 1 to 12. The corresponding size of the feedback matrix V is also depicted in FIGS. 17 and 18 for the chosen parameters Nr=12 and Nc=1 to 12. Furthermore, a number of angles, Na, ranging from 22 to 132, is given in table T12a, T12b.

FIGS. 19 and 20 show an exemplary angles definition table, T13a, T13b illustrating the order of angles in the compressed beamforming feedback matrix subfield for a number of transmit antennas Nr=13 according to the disclosure, the first part T13a, 1900 of the table is shown in FIG. 19 and the second part T13b, 2000 of the table is shown in FIG. 20.

The angles definition table, T13a, T13b defines the order of angles in the compressed beamforming feedback matrix subfield for a number of transmit antennas Nr=13 and for different numbers of Nc, i.e. spatial streams ranging from 1 to 13. The corresponding size of the feedback matrix V is also depicted in FIGS. 19 and 20 for the chosen parameters Nr=13 and Nc=1 to 13. Furthermore, a number of angles, Na, ranging from 24 to 156, is given in table T13a, T13b.

FIGS. 21 and 22 show an exemplary angles definition table, T14a, T14b illustrating the order of angles in the compressed beamforming feedback matrix subfield for a number of transmit antennas Nr=14 according to the disclosure, the first part T14a, 2100 of the table is shown in FIG. 21 and the second part T14b, 2200 of the table is shown in FIG. 22.

The angles definition table, T14a, T14b defines the order of angles in the compressed beamforming feedback matrix subfield for a number of transmit antennas Nr=14 and for different numbers of Nc, i.e. spatial streams ranging from 1 to 14. The corresponding size of the feedback matrix V is also depicted in FIGS. 21 and 22 for the chosen parameters Nr=14 and Nc=1 to 14. Furthermore, a number of angles, Na, ranging from 26 to 182, is given in table T14a, T14b.

FIGS. 23 and 24 show an exemplary angles definition table, T15a, T15b illustrating the order of angles in the compressed beamforming feedback matrix subfield for a number of transmit antennas Nr=15 according to the disclosure, the first part T15a, 2300 of the table is shown in FIG. 23 and the second part T15b, 2400 of the table is shown in FIG. 24.

The angles definition table, T15a, T15b defines the order of angles in the compressed beamforming feedback matrix subfield for a number of transmit antennas Nr=15 and for different numbers of Nc, i.e. spatial streams ranging from 1 to 15. The corresponding size of the feedback matrix V is also depicted in FIGS. 23 and 24 for the chosen parameters Nr=15 and Nc=1 to 15. Furthermore, a number of angles, Na, ranging from 28 to 210, is given in table T15a, T15b.

FIGS. 25, 26 and 27 show an exemplary angles definition table, T16a, T16b, T16c illustrating the order of angles in the compressed beamforming feedback matrix subfield for a number of transmit antennas Nr=16 according to the disclosure, the first part T16a, 2500 of the table is shown in FIG.

25, the second part T16b, 2600 of the table is shown in FIG. 26 and the third part T16 c, 2700 of the table is shown in FIG. 27.

The angles definition table, T16a, T16b, T16c defines the order of angles in the compressed beamforming feedback matrix subfield for a number of transmit antennas Nr=16 and for different numbers of Nc, i.e. spatial streams ranging from 1 to 16. The corresponding size of the feedback matrix V is also depicted in FIGS. 25, 26 and 27 for the chosen parameters Nr=16 and Nc=1 to 16. Furthermore, a number of angles, Na, ranging from 30 to 240, is given in table T16a, T16b, T16c.

Figure 28:
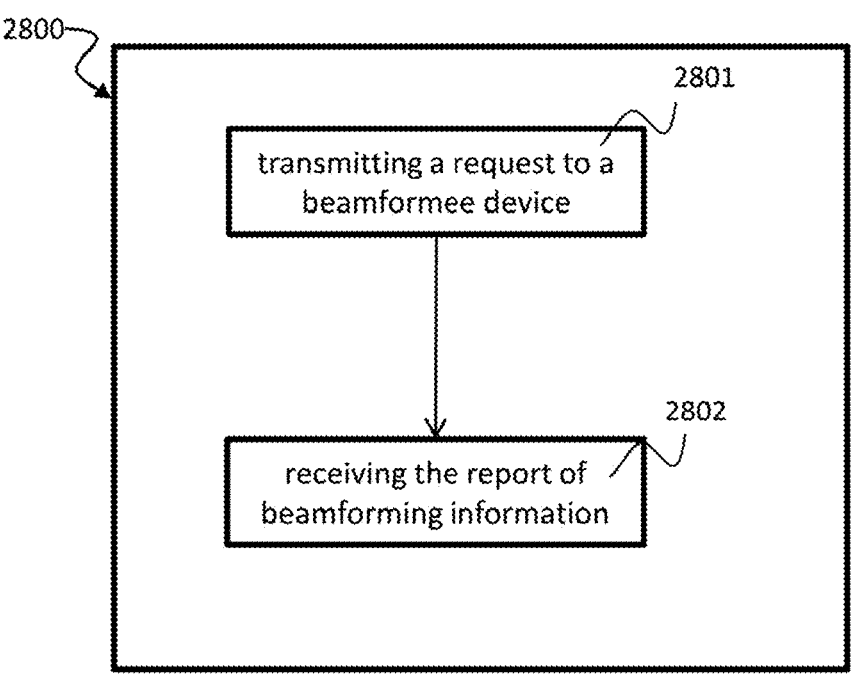
FIG. 28 shows a schematic diagram of a method 2800 for requesting beamforming information according to the disclosure.

FIG. 28 shows a schematic diagram of a method 2800 for requesting beamforming information according to the disclosure.

The method 2800 comprises: transmitting 2801, by a beamformer device, e.g. beamformer device 110 shown in FIG. 1, a request to a beamformee device, e.g. beamformec device 120 shown in FIG. 1, the request comprising a set of sounding tone indices, the set of sounding tone indices indicating tones for which a report of beamforming information is requested from the beamformee device, wherein the tones are defined according to a first WiFi scheme, wherein the set of sounding tone indices is based on a first tone plan defined by the first WiFi scheme for a partial channel bandwidth and on a second tone plan defined by a second WiFi scheme for a full channel bandwidth.

The method 2800 further comprises: receiving 2802 the report of beamforming information from the beamformee device based on the set of sounding tone indices.

The first tone plan may be defined as shown in FIG. 4 and the second tone plan may be defined as shown in FIG. 2.

The first WiFi scheme may be 802.11be WiFi, particularly supporting channel bandwidths of 80 MHz, 160 MHz, 80+80 MHZ, 240 MHz and 320 MHz. The second WiFi scheme may be 802.11ax WiFi, particularly supporting a channel bandwidth of 80 MHZ.

Figure 29:
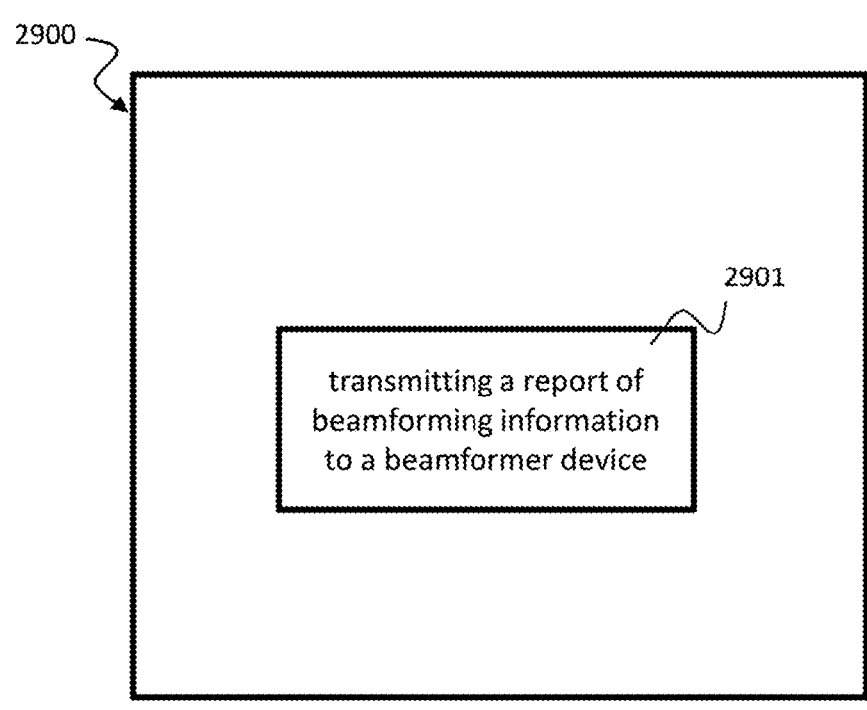
FIG. 29 shows a schematic diagram of a method 2900 for reporting beamforming information according to the disclosure.

FIG. 29 shows a schematic diagram of a method 2900 for reporting beamforming information according to the disclosure.

The method 2900 comprises: transmitting 2901, by a beamformce device, e.g. beamformee device 120 shown in FIG. 1, a report of beamforming information to a beamformer device, e.g. beamformer device 110 shown in FIG. 1, based on a set of sounding tone indices received from the beamformer device, wherein the set of sounding tone indices are indicating tones for which a report of beamforming information is requested from the beamformee device, wherein the tones are defined according to a first WiFi scheme, wherein the set of sounding tone indices is based on a first tone plan defined by the first WiFi scheme for a partial channel bandwidth and on a second tone plan defined by a second WiFi scheme for a full channel The first tone plan may be defined as shown in FIG. 4 and the second tone plan may be defined as shown in FIG. 2.

This method corresponds to the beamformee device described above for the third aspect of the disclosure.

The first WiFi scheme may be 802.11be WiFi, particularly supporting channel bandwidths of 80 MH2, 160 MH2, 80+80 MH2, 240 MHz and 320 MHz. The second WiFi scheme may be 802.11ax WiFi, particularly supporting a channel bandwidth of 80 MHZ.

Figure 30:
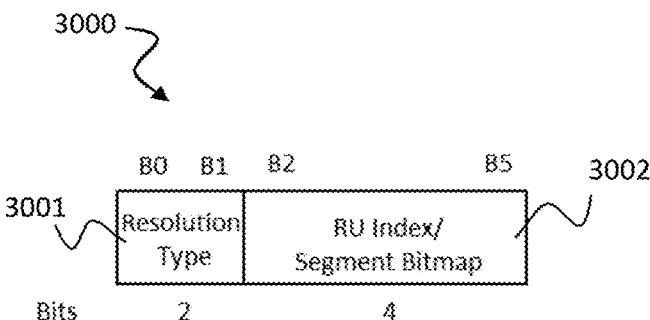
FIG. 30 shows a schematic diagram of a Partial BW Info Field.

FIG. 30 shows a schematic diagram of the Partial BW Info Field 3000. The Partial BW Info Field 3000 comprises 6 bits B0-B5. The two least significant bits 3001 (B0 and B1) of the Partial BW Info Field indicate the type of partial BW, i.e. the resolution type. The four most significant bits 3002 (B2, B3, B4 and B5) of the Partial BW Info Field indicate a specific BW corresponding the indicated partial BW type, the RU Index and/or a Segment Bitmap. It should be understood that also the two most significant bits (B4, B5) can indicate the resolution type, whereas the four least significant bits (B0, B1, B2, B3) can indicate the specific BW corresponding the indicated partial BW type, the RU Index and/or a Segment Bitmap.

FIG. 31 shows a schematic diagram of a modified STA Info Subfield 3100, wherein the bits B11-B16 have been replaced by the Partial BW Info Field 3000.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A beamformer device comprising:
a memory configured to store instructions; and
a processor coupled to the memory and configured to execute the instructions and cause the beamformer device to:
transmit a request to a beamformee device, wherein the request comprises a set of sounding tone indices that indicate tones for which a report of beamforming information is requested from the beamformee device,
wherein the tones are defined according to a first WiFi scheme,
wherein the set of sounding tone indices is based on a first tone plan defined by the first WiFi scheme for a partial channel bandwidth and on a second tone plan defined by a second WiFi scheme for a full channel bandwidth, and
wherein the sounding tone indices are based on one of the following:
(i) a reuse of sounding tone indices defined for resource units of the second tone plan and a definition of which of the resource units of the second tone plan correspond to resource units of the first tone plan,
(ii) a unified sounding index set that comprises sounding tone indices for both the first tone plan for the partial channel bandwidth and the second tone plan for the full channel bandwidth, and
(iii) a sounding index set for the partial channel bandwidth and additional center tones indices for the full channel bandwidth.

2. The beamformer device of claim 1, wherein the first WiFi scheme is 802.11be WiFi, and wherein the second WiFi scheme is 802.11ax WiFi.

3. The beamformer device of claim 1, wherein the first WiFi scheme is supporting channel bandwidths of 80 MHz, 160 MHz, 80 +80 MHz, 240 MHz and 320 MHz.

4. The beamformer device of claim 1, wherein the second WiFi scheme is supporting a channel bandwidth of 80 MHz.

5. The beamformer device of claim 1, wherein the full channel bandwidth is 80 MHz; and wherein the partial channel bandwidth is any subset of the full channel bandwidth.

6. The beamformer device of claim 1, wherein the sounding tone indices are based on a unified sounding index set that comprises sounding tone indices for both the first tone plan for the partial channel bandwidth and the second tone plan for the full channel bandwidth.

7. The beamformer device of claim 1, wherein the sounding tone indices are based on a sounding index set for the partial channel bandwidth and additional center tones indices for the full channel bandwidth.

8. The beamformer device of claim 1, wherein the sounding tone indices are based on a reuse of sounding tone indices defined for resource units of the second tone plan and a definition of which of the resource units of the second tone plan correspond to resource units of the first tone plan.

9. The beamformer device of claim 6, wherein the set of sounding tone indices for a channel bandwidth is greater than the full channel bandwidth, and wherein the channel bandwidth is one of 160 MHz, 80+80 MHz, 240 MHz or 320 MHZ, and is based on a duplication of rules defined for the set of sounding tone indices within each segment of the full channel bandwidth.

10. The beamformer device of claim 1, wherein the request to the beamformee device indicates a channel bandwidth, and wherein the indicated channel bandwidth is a full channel bandwidth defined for the first WiFi scheme.

11. The beamformer device of claim 10, wherein the indicated channel bandwidth is a full channel bandwidth of 80 MHz, 80+80 MHz, 160 MHz, 240 MHz, 320 MHz or any partial bandwidth thereof.

12. The beamformer device of claim 1, wherein the set of sounding tone indices is defined per channel bandwidth and per number of tones, Ng, wherein Ng=4 or Ng=16.

13. A method for requesting beamforming information, the method comprising:

transmitting, by a beamformer device, a request to a beamformee device, wherein the request comprises a set of sounding tone indices that indicate tones for which a report of beamforming information is requested from the beamformee device, wherein the tones are defined according to a first WiFi scheme, wherein the set of sounding tone indices is based on a first tone plan defined by the first WiFi scheme for a partial channel bandwidth and on a second tone plan defined by a second WiFi scheme for a full channel bandwidth, and wherein the sounding tone indices are based on one of the following:

(i) a reuse of sounding tone indices defined for resource units of the second tone plan and a definition of which of the resource units of the second tone plan correspond to resource units of the first tone plan, (ii) a unified sounding index set that comprises sounding tone indices for both the first tone plan for the partial channel bandwidth and the second tone plan for the full channel bandwidth, and (iii) a sounding index set for the partial channel bandwidth and additional center tones indices for the full channel bandwidth; and receiving the report of beamforming information from the beamformee device based on the set of sounding tone indices.

14. The method of claim 13, wherein the sounding tone indices are based on a unified sounding index set that comprises sounding tone indices for both the first tone plan for the partial channel bandwidth and the second tone plan for the full channel bandwidth.

15. The method of claim 13, wherein the sounding tone indices are based on a sounding index set for the partial channel bandwidth and additional center tones indices for the full channel bandwidth.

16. The method of claim 13, wherein the sounding tone indices are based on a reuse of sounding tone indices defined for resource units of the second tone plan and a definition of which of the resource units of the second tone plan correspond to resource units of the first tone plan.

17. A beamformer device comprising a memory configured to store instructions and a processor configured to execute the instructions stored in the memory to cause the beamformer device to:

transmit a set of sounding tone indices to a beamformer device;

receive a beamforming report from the beamformee device in response to the set of sounding tone indices, wherein the beamforming report comprises a compressed precoder matrix; and reconstruct a precoder matrix based on the compressed precoder matrix, wherein the compressed precoder matrix is defined by a set of angles in an order that implies a sequence of mathematical operations to be applied on a unit matrix to reconstruct the precoder matrix, and wherein the set of angles is determined based on an extension of a formula for a number of transmit antennas and a number of spatial streams supported by 802.11ax WiFi to a number of transmit antennas (Nr) and a number of spatial streams (Nc) supported by 802.11be WiFi.

18. The beamformer device of claim 17, wherein the extension of the formula is for values of $8 < Nr \leq 16$ and values of $1 \leq Nc \leq 16$ corresponding to matrices from 9×1 to 16×16.

19. The beamformer device of claim 17, wherein the beamforming report comprises signal-to-noise ratio (SNR) values of spatial streams reported by the beamformee device, and wherein each reported i-th SNR value, wherein i is an integer and i>8, corresponds to an SNR that results from applying an i-th column of the reported precoder matrix by the beamformer device.

20. The beamformer device of claim 19, wherein the beamforming report comprises SNR values of spatial streams for multiple-input multiple-output (MIMO) schemes larger than 8×8.

* * * * *